US012338383B2

(12) United States Patent
Patel et al.

(10) Patent No.: US 12,338,383 B2
(45) Date of Patent: *Jun. 24, 2025

(54) 3D-PRINTED POLYROTAXANE ADDITIVES AND COMPOSITIONS

(71) Applicants: Saudi Arabian Oil Company, Dhahran (SA); William Marsh Rice University, Houston, TX (US)

(72) Inventors: Hasmukh A. Patel, Katy, TX (US); Ali Z. Khater, Houston, TX (US); Peter Boul, Houston, TX (US); Pulickel M. Ajayan, Houston, TX (US); Muhammad M. Rahman, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/550,631

(22) Filed: Dec. 14, 2021

(65) Prior Publication Data

US 2023/0183534 A1    Jun. 15, 2023

(51) Int. Cl.
| C09K 3/10 | (2006.01) |
| B33Y 10/00 | (2015.01) |
| B33Y 70/00 | (2020.01) |
| C08G 83/00 | (2006.01) |
| C08K 3/36 | (2006.01) |
| C08L 63/00 | (2006.01) |

(52) U.S. Cl.
CPC ............. *C09K 3/1006* (2013.01); *B33Y 10/00* (2014.12); *B33Y 70/00* (2014.12); *C08G 83/007* (2013.01); *C08K 3/36* (2013.01); *C08L 63/00* (2013.01)

(58) Field of Classification Search
CPC ...... C09K 3/1006; B33Y 10/00; B33Y 70/00; C08G 83/007; C08K 3/36; C08L 63/00
USPC .......................................................... 525/523
See application file for complete search history.

(56) References Cited

U.S. PATENT DOCUMENTS

| 1,811,799 | A | 6/1931 | Lukens |
| 2,705,050 | A | 3/1955 | Davis et al. |
| 3,301,797 | A | 1/1967 | Drucket et al. |
| 3,481,903 | A | 12/1969 | Alelio |

(Continued)

FOREIGN PATENT DOCUMENTS

| BR | 102018014722 | 4/2020 |
| CN | 104204035 | 12/2014 |

(Continued)

OTHER PUBLICATIONS

Toyama et al., JP 2016056308 A machine translation in English used for citation, Apr. 21, 2016. (Year: 2016).*

(Continued)

*Primary Examiner* — David T Karst
(74) *Attorney, Agent, or Firm* — Fish & Richardson P.C.

(57) ABSTRACT

This document relates to sealant compositions containing a sliding-ring polymer (polyrotaxane) additive and a polymeric matrix material. The sealant materials exhibit enhanced mechanical properties as compared to the same sealant composition that does not contain the additive. This document also relates to 3D-printed sealant compositions containing a sliding-ring polymer (polyrotaxane) additive and a polymeric matrix material.

12 Claims, 9 Drawing Sheets

(56) References Cited

U.S. PATENT DOCUMENTS

| | | | |
|---|---|---|---|
| 3,887,009 A | 6/1975 | Miller et al. | |
| 3,938,594 A | 2/1976 | Rhudy et al. | |
| 4,137,182 A | 1/1979 | Golinkin | |
| 4,272,430 A | 6/1981 | Pieh et al. | |
| 4,615,809 A | 10/1986 | King | |
| 4,771,112 A | 9/1988 | Engelbrecht | |
| 4,797,433 A | 1/1989 | Lahalih | |
| 4,883,126 A | 11/1989 | Leland | |
| 5,007,481 A | 4/1991 | Williams et al. | |
| 5,062,897 A | 11/1991 | Katsunnata | |
| 5,159,828 A | 11/1992 | Steiger | |
| 5,352,290 A | 10/1994 | Takeshita et al. | |
| 5,401,312 A | 3/1995 | Hanst | |
| 5,645,637 A | 7/1997 | Yaniv | |
| 5,891,983 A | 4/1999 | Albrecht | |
| 6,089,318 A | 7/2000 | Laramay et al. | |
| 6,324,916 B1 | 12/2001 | Jessop | |
| 6,609,067 B2 | 8/2003 | Tare | |
| 6,664,215 B1 | 12/2003 | Tomlinson | |
| 6,668,927 B1 | 12/2003 | Chatterji et al. | |
| 6,828,378 B2 | 12/2004 | Okumura et al. | |
| 6,844,852 B1 | 1/2005 | Simons | |
| 7,077,199 B2 | 7/2006 | Vinegar et al. | |
| 7,497,258 B2 | 3/2009 | Savery et al. | |
| 7,523,784 B2 | 4/2009 | Lewis et al. | |
| 7,525,872 B2 | 4/2009 | Tang et al. | |
| 7,527,098 B2 | 5/2009 | Santra et al. | |
| 7,555,414 B2 | 6/2009 | Calhoun | |
| 7,612,142 B2 | 11/2009 | Ito et al. | |
| 7,622,527 B2 | 11/2009 | Ito et al. | |
| 7,637,319 B2 | 12/2009 | Savery et al. | |
| 7,654,326 B1 | 2/2010 | Santra et al. | |
| 7,773,454 B2 | 8/2010 | Barolak et al. | |
| 7,787,327 B2 | 8/2010 | Tang et al. | |
| 7,799,867 B2 | 9/2010 | Ito et al. | |
| 7,833,344 B2 | 11/2010 | Santra et al. | |
| 7,847,049 B2 | 12/2010 | Ito et al. | |
| 7,893,011 B2 | 2/2011 | Lewis et al. | |
| 7,893,168 B2 | 2/2011 | Ito et al. | |
| 7,943,718 B2 | 5/2011 | Ito et al. | |
| 7,981,943 B2 | 7/2011 | Ito et al. | |
| 8,007,911 B2 | 8/2011 | Ito et al. | |
| 8,017,688 B2 | 9/2011 | Ito et al. | |
| 8,124,569 B2 | 2/2012 | Khan et al. | |
| 8,142,562 B2 | 3/2012 | Klettke et al. | |
| 8,309,498 B2 | 11/2012 | Funkhouser et al. | |
| 8,382,476 B2 | 2/2013 | Schulte et al. | |
| 8,418,763 B1 | 4/2013 | Deen et al. | |
| 8,450,252 B2 | 5/2013 | Funkhouser et al. | |
| 8,450,415 B2 | 5/2013 | Ito et al. | |
| 8,580,906 B2 | 11/2013 | Hayashi et al. | |
| 8,587,493 B2 | 11/2013 | Dickey et al. | |
| 8,673,364 B2 | 3/2014 | Jalota et al. | |
| 8,770,038 B2 | 7/2014 | Secq | |
| 8,899,331 B2 | 12/2014 | Burnham | |
| 9,023,150 B2 | 5/2015 | Brenneis et al. | |
| 9,068,051 B2 | 6/2015 | Yamasaki et al. | |
| 9,085,487 B2 | 7/2015 | Silva et al. | |
| 9,228,993 B2 | 1/2016 | Shine et al. | |
| 9,266,972 B2 | 2/2016 | Yamasaki et al. | |
| 9,375,699 B2 | 6/2016 | Ladet | |
| 9,428,682 B2 | 8/2016 | Muthusamy et al. | |
| 9,617,460 B2 | 4/2017 | Reddy | |
| 9,708,869 B2 | 7/2017 | Sarmah et al. | |
| 10,009,994 B2 | 6/2018 | Sawada et al. | |
| 10,048,336 B2 | 8/2018 | Hakimuddin | |
| 10,060,242 B2 | 8/2018 | Benoit et al. | |
| 10,150,905 B1 | 12/2018 | Reddy | |
| 10,351,758 B2 | 7/2019 | Hull et al. | |
| 10,647,909 B2 | 5/2020 | Li et al. | |
| 10,836,950 B1 | 11/2020 | Patel et al. | |
| 10,871,061 B2 | 12/2020 | Hull et al. | |
| 10,913,683 B2 | 2/2021 | Rahman et al. | |
| 10,966,317 B2 | 3/2021 | Abe et al. | |
| 11,078,406 B2 | 8/2021 | Hull et al. | |
| 11,130,900 B2 | 9/2021 | Patel et al. | |
| 11,230,497 B2 | 1/2022 | Patel et al. | |
| 2003/0138398 A1 | 7/2003 | Okumura et al. | |
| 2006/0048671 A1 | 3/2006 | Ong | |
| 2008/0006410 A1 | 1/2008 | Looney et al. | |
| 2008/0156225 A1 | 7/2008 | Bury | |
| 2008/0287633 A1 | 11/2008 | Drumheller | |
| 2009/0030108 A1 | 1/2009 | Ito et al. | |
| 2009/0214871 A1 | 8/2009 | Fukuda et al. | |
| 2009/0312491 A1 | 12/2009 | Ito et al. | |
| 2009/0312492 A1 | 12/2009 | Ruslim et al. | |
| 2010/0006288 A1 | 1/2010 | Santra et al. | |
| 2012/0006551 A1 | 1/2012 | Carman et al. | |
| 2012/0322695 A1 | 12/2012 | Kefi et al. | |
| 2013/0118740 A1 | 5/2013 | Sherman et al. | |
| 2014/0096964 A1 | 4/2014 | Chakraborty et al. | |
| 2014/0342531 A1 | 11/2014 | Tominaga et al. | |
| 2015/0024122 A1 | 1/2015 | Wu et al. | |
| 2015/0033719 A1 | 2/2015 | Lawrence et al. | |
| 2015/0057196 A1 | 2/2015 | Debord et al. | |
| 2015/0061669 A1 | 3/2015 | Hakimuddin | |
| 2015/0152724 A1 | 6/2015 | Amendt et al. | |
| 2015/0198008 A1 | 7/2015 | Smith et al. | |
| 2016/0102238 A1 | 4/2016 | Muthusamy et al. | |
| 2016/0177655 A1 | 6/2016 | Fripp | |
| 2016/0264813 A1 | 9/2016 | Sawada et al. | |
| 2017/0066959 A1 | 3/2017 | Hull et al. | |
| 2017/0218248 A1 | 8/2017 | Boul et al. | |
| 2017/0369761 A1 | 12/2017 | Jones et al. | |
| 2018/0045870 A1 | 2/2018 | Asahi et al. | |
| 2018/0215988 A1 | 8/2018 | Gamwell et al. | |
| 2018/0335494 A1 | 11/2018 | Hakimuddin | |
| 2019/0054536 A1 | 2/2019 | Xu et al. | |
| 2019/0077071 A1 | 3/2019 | Ware et al. | |
| 2019/0110361 A1* | 4/2019 | Abe | H05K 1/0393 |
| 2019/0144569 A1 | 5/2019 | Ke et al. | |
| 2019/0211658 A1 | 7/2019 | Hull et al. | |
| 2019/0310396 A1 | 10/2019 | Matsumoto et al. | |
| 2020/0131396 A1* | 4/2020 | Kang | C09D 163/00 |
| 2020/0277441 A1 | 9/2020 | Stoddart et al. | |
| 2020/0308341 A1 | 10/2020 | Yan et al. | |
| 2020/0325070 A1 | 10/2020 | Patel et al. | |
| 2021/0024806 A1 | 1/2021 | Patel et al. | |
| 2021/0024808 A1 | 1/2021 | Schipper et al. | |
| 2021/0024814 A1 | 1/2021 | Schipper et al. | |
| 2021/0087419 A1 | 3/2021 | Zhu et al. | |
| 2021/0101833 A1 | 4/2021 | Thaemlitz et al. | |
| 2021/0102112 A1 | 4/2021 | Patel | |
| 2021/0130676 A1 | 5/2021 | Patel et al. | |
| 2021/0198558 A1 | 7/2021 | Hull et al. | |
| 2021/0198559 A1 | 7/2021 | Hull et al. | |
| 2021/0222055 A1 | 7/2021 | Schipper et al. | |
| 2021/0302292 A1 | 9/2021 | Boul et al. | |
| 2023/0183471 A1 | 6/2023 | Patel et al. | |

FOREIGN PATENT DOCUMENTS

| | | |
|---|---|---|
| CN | 107522436 | 12/2017 |
| CN | 109133754 | 1/2019 |
| CN | 112456870 | 3/2021 |
| EP | 0383348 | 8/1990 |
| EP | 2820413 | 1/2015 |
| EP | 3060909 | 8/2016 |
| JP | H 10158045 | 6/1998 |
| JP | 2016056308 A * | 4/2016 |
| JP | 2016088878 | 5/2016 |
| JP | 6647751 | 2/2020 |
| WO | WO 2016053319 | 4/2016 |
| WO | WO 2016080674 | 5/2016 |
| WO | WO 2019090140 | 5/2019 |
| WO | WO 2019147559 | 8/2019 |

OTHER PUBLICATIONS

U.S. Appl. No. 16/393,016, filed Apr. 24, 2019, Hakimuddin et al.
U.S. Appl. No. 16/593,820, filed Oct. 4, 2019, Patel et al.
U.S. Appl. No. 16/668,730, filed Oct. 30, 2019, Patel et al.
U.S. Appl. No. 17/107,428, filed Nov. 30, 2020, Hull et al.

(56) References Cited

OTHER PUBLICATIONS

U.S. Appl. No. 17/550,653, filed Dec. 14, 2021, Patel et al.
Acquah et al., "Carbon Nanotubes and Graphene as Additives in 3D Printing," Carbon Nanotubes—Current Progress of Their Polymer Composites, InTech, 2016, 26 pages.
Adhikary et al., "Effects of carbon nanotubes on expanded glass and silica aerogel based lightweight concrete," Nature, Scientific Reports, Jan. 2021, 11:2104, 11 pages.
Andrew, "Global $CO_2$ emissions from cement production," Earth Syst. Sci. Data, Jan. 2018, 10:195-217, 23 pages.
API, "10B-2, Recommended Practice for Testing Well Cements," American Petroleum Institute, Apr. 2019, 1-124, RP 10B-2, 124 pages.
Arbad et al., "A Review of Recent Research on Contamination of Oil Well Cement with Oil-Based Drilling Fluid and the Need of New and Accurate Correlations," ChemEngineering, Apr. 2020, 20 pages.
Ashik et al., "A review on methane transformation to hydrogen and nanocarbon: Relevance of catalyst characteristics and experimental parameters on yield," Renewable and Sustainable Energy Reviews, Sep. 2017, 76:743-767, 25 pages.
asmi.jp [online], "SeRM Series Products List," asmi.jp, Advanced Softmaterials Inc., retrieved from URL <www.asmi.jp/en/product#sec_03>, retrieved on Aug. 15, 2019, available on or before Jan. 2013 (via wayback machine URL <https://web.archive.org/web/20130315000000*/www.asmi.jp/en/product>), 5 pages.
Bagheri et al., "Rubber-Toughened Epoxies: A Critical Review," Polym. Rev., 2009, 49:201-225, 26 pages.
Bett, "Geothermal Well Cementing, Materials and Placement Techniques," United Nations University, Geothermal Training Programme, Reports 2010, No. 10, 2010, 32 pages.
Brichni et al., "Optimisation of Magnesium Oxychloride Cement Properties by Silica Glass," Adv. Cem. Res., Jul. 2016, 28:10 (654-663), 10 pages.
Bruns and Stoddart, "The Nature of the Mechanical Bond: from molecules to machines," Wiley, 2017, 786 pages.
Buchanan et al., "Metal 3D printing in construction: A review of methods, research, applications, opportunities and challenges," Engineering Structures, Feb. 2019, 180:332-348, 36 pages.
Cao et al., "Study of the in-situ growth of carbon nanofibers on cement clinker," Mater. Res. Express, May 2020, 7:5 (055306), 10 pages.
Capper et al., "Internal antiplasticisation in highly crosslinked amine cured multifunctional epoxy resins," Polymer, 2018, 146:321-330, 11 pages.
Carey et al., "Fracture-permeability behavior of shale," Journal of Unconventional Oil and Gas Resources, Sep. 2015, 11, 53 pages.
Chambers et al., "Liquid crystal elastomer-nanoparticle systems for actuation," Journal of Materials Chemistry, 2009, 19.11:1524-1531, 7 pages.
Chatham et al., "A review of the process physics and material screening methods for polymer powder bed fusion additive manufacturing," Progress in Polymer Science, Jun. 2019, 93:68-95, 28 pages.
Chen et al., "Enhancement of mechanical and wear resistance performance in hBN reinforced epoxy nanocomposites," Polym. Int., 2017, 66: 659, 25 pages.
Chen et al., "Rapid control of phase growth by nanoparticles," Nature Communications, May 2014, 5.1, 9 pages.
Cho et al., "Cell-Encapsulating Hydrogel Puzzle: Polyrotaxane-Based Self-Healing Hydrogels," Chem. Eur. J., 2019, 26(4):913-920, 22 pages.
Choi et al., "Highly elastic binders integrating polyrotaxanes for silicon microparticle anodes in lithium ion batteries," Science, Jul. 2017, 357.6348:279-283, 5 pages.
Cordero et al., "Strengthening of ferrous binder jet 3D printed components through bronze infiltration," Additive Manufacturing, May 2017, 15:87-92, 6 pages.
Cui et al., "Electrical and mechanical properties of electrically conductive adhesives from epoxy, micro-silver flakes, and nano-hexagonal boron nitride particles after humid and thermal aging," International Journal of Adhesion and Adhesives, Jul. 2013, 44:232-236, 5 pages.
Davidson et al., "3D Printable and Reconfigurable Liquid Crystal Elastomers with Light-Induced Shape Memory via Dynamic Bond Exchange," Advanced Materials, Jan. 2020, 6 pages.
DebRoy et al., "Additive manufacturing of metallic components-process, structure and properties," Progress in Materials Science, Mar. 2018, 92:112-224, 114 pages.
DebRoy et al., "Scientific, technological and economic issues in metal printing and their solutions," Nature Materials, Jul. 2019, 18, 7 pages.
Dowling et al., "A review of critical repeatability and reproducibility issues in powder bed fusion," Materials & Design, Jan. 2020, 186, 18 pages.
El-Wardany et al., "Challenges in three-dimensional printing of high-conductivity copper," Journal of Electronic Packaging, Jun. 2018, 140.2:020907, 12 pages.
Enayatpour et al., "Advanced Modeling of Cement Displacement Complexities," SPE/IADC-184702-MS, Society of Petroleum Engineers (SPE), presented at the SPE/IADC Drill Conference and Exhibition, Mar. 2017, 21 pages.
Fayazfar et al., "A critical review of powder-based additive manufacturing of ferrous alloys: Process parameters, microstructure and mechanical properties," Materials & Design, Apr. 2018, 144:98-128, 31 pages.
Foldyna et al., "Dispersion of carbon nanotubes for application in cement composites," Science Direct, Procedia Engineering, 2016, 149:94-99, 6 pages.
Funkhouser and Norman, "Synthetic Polymer Fracturing Fluid for High-Temperature Application," SPE 80236, Society of Petroleum Engineers (SPE), International Symposium on Oilfield Chemistry, Feb. 5-7, 2003, 6 pages.
Gaillard et al., "Novel Associative Acrylamide-based Polymers for Proppant Transport in Hydraulic Fracturing Fluids," SPE 164072, Society of Petroleum Engineers (SPE), SPE International Symposium on Oilfield Chemistry, Apr. 8-10, 2013, 11 pages.
Gelebart et al., "Photoresponsive fiber array: toward mimicking the collective motion of cilia for transport applications," Advanced Functional Materials, Aug. 2016, 26.29:5322-5327, 6 pages.
Genedy et al., "Examining epoxy-based nanocomposites in wellbore seal repair for effective $CO_2$ sequestration," Energy Procedia, Jan. 2014, 63:5798-5807, 10 pages.
Gladman et al., "Biomimetic 4D printing," Nature Materials, Apr. 2016, 15.4:413-418, 7 pages.
Global Status of CCS Report, Dec. 11, 2020, Global CCS Institute, 44 pages.
Goeppert et al., "Air as the renewable carbon source of the future: an overview of $CO_2$ capture from the atmosphere," Energy Environ. Sci., 2012, 5: 7833, 12 pages.
Gojny et al., "Carbon nanotube-reinforced epoxy-composites: enhanced stiffness and fracture toughness at low nanotube content," Compos. Sci. Technol., 2004, 64:2363-2371, 9 pages.
Gong et al., "Analysis of defect generation in Ti-6Al-4V parts made using powder bed fusion additive manufacturing processes," Additive Manufacturing, Oct. 2014, 1, 60 pages.
Gorsse et al., "Additive manufacturing of metals: a brief review of the characteristic microstructures and properties of steels, Ti-6Al-4V and high-entropy alloys," Science and Technology of Advanced Materials, Dec. 2017, 18.1:584-610, 28 pages.
Guo et al., "Shape memory epoxy composites with high mechanical performance manufactured by multi-material direct ink writing," Compos. Part A Appl. Sci. Manuf., 2020, 135: 105903, 8 pages.
Gupta and Carman, "Fracturing Fluid for Extreme Temperature Conditions is Just as Easy as the Rest," SPE 140176, Society of Petroleum Engineers (SPE), SPE Hydraulic Fracturing Technology Conference, Jan. 24-26, 2011, 5 pages.
Harada et al., "Preparation and properties of inclusion complexes of polyethylene glycol with α-cyclodextrin," Macromolecules, 1993, 26:5698-5703, 6 pages.
Harada et al., "Supramolecular polymeric materials via cyclodextrin-guest interactions," Accounts of Chemical Research, Jul. 2014, 47.7:2128-2140, 13 pages.

(56) References Cited

OTHER PUBLICATIONS

Hart et al., "Material properties and applications of mechanically interlocked polymers," Nat. Rev. Mater., 2021, 6:6 (508-530), 23 pages.
Hepburn et al., "The technological and economic prospects for $CO_2$ utilization and removal," Nature, Nov. 2019, 575, 11 pages.
Herzog et al., "Additive Manufacturing of Metals," Acta Mater. 2016, 117:371-392, 22 pages.
Hitzler et al., "In-plane anisotropy of selective laser-melted stainless steel: The importance of the rotation angle increment and the limitation window," Proceedings of the Institution of Mechanical Engineers, Part L: Journal of Materials: Design and Applications, Jul. 2019, 233.7:1419-1428, 10 pages.
Hojjatzadeh et al., "Direct observation of pore formation mechanisms during LPBF additive manufacturing process and high energy density laser welding," International Journal of Machine Tools and Manufacture 153:103555, Jun. 2020, 32 pages.
Houben et al., "Plasticization behavior of crown-ether containing polyimide membranes for the separation of $CO_2$," Separation and Purification Technology, 2021, 255:117307, 10 pages.
Hoyos-Palacio et al., "Catalytic effect of Fe, Ni, Co and Mo on the CNTs production," IOP Conference Series: Materials Science and Engineering, 2014, 59:012005, 9 pages.
Huang et al., "Finite element analysis of thermal behavior of metal powder during selective laser melting," International Journal of Thermal Sciences, Jun. 2016, 104:146-157, 12 pages.
Hull et al., "Chemomechanical Effects of Oxidizer-$CO_2$ Systems Upon Hydraulically Fractured Unconventional Source Rock," Canadian Journal of Chemical Engineering, 2021, 26 pages.
Hull et al., "Oxidative Kerogen Degradation: A Potential Approach to Hydraulic Fracturing in Unconventionals," Energy Fuels, 2019, 33: 4758-4766, 8 pages.
Hull et al., "Synthesis and structural characterization of $CO_2$-soluble oxidizers [$Bu_4N$]$BrO_3$ and [$Bu_4N$]$ClO_3$ and their dissolution in cosolvent-modified $CO_2$ for reservoir applications," RSC Advances, Royal Society of Chemistry, Dec. 21, 2020, 10: 44973, 8 pages.
Hur et al., "Reactive force fields for modeling oxidative degradation of organic matter in geological formations," RSC Adv. 2021, 11:29298-29307, 23 pages.
Isaka et al., "Influence of long-term operation of supercritical carbon dioxide based enhanced geothermal system on mineralogical and microstructurally-induced mechanical alteration of surrounding rock mass," Renewable Energy, Jun. 2019, 136, 14 pages.
Isfahani et al., "Dispersion of multi-walled carbon nanotubes and its effects on the properties of cement composites," Cement and Concrete Composites, Nov. 2016, 74:154-163, 10 pages.
Isobe et al., "Thermally dissociable pseudo-polyrotaxane as a supramolecular shrinkage suppressor for epoxy-amine curing system," Journal of Polymer Science Part A: Polymer Chemistry, Mar. 2008, 46.6:2305-2308, 4 pages.
Jafariesfad et al., "Cement Sheath Modification Using Nanomaterials for Long-term Zonal Isolation of Oil Wells: Review," Journal of Petroleum Science and Engineering, 2017, 156:662-672, 28 pages.
Jiang et al., "Highly Stretchable and Instantly Recoverable Slide-Ring Gels Consisting of Enzymatically Synthesized Polyrotaxane with Low Host Coverage," Chem. Mater., 2018, 30:15 (5013), 10 pages.
Jin et al., "Synthesis and application of epoxy resins: A review," J. Ind. Eng. Chem., Sep. 2015, 29:1-11, 11 pages.
Kato et al., "Organic-Inorganic Hybrid Slide-Ring Gels: Polyrotaxanes Consisting of Poly(dimethylsiloxane) and γ-Cyclodextrin and Subsequent Topological Cross-Linking," Macromolecules, Aug. 18, 2009, 42:7129-7136, 8 pages.
Khuenkaew et al., "Resistance spot welding of SUS316L austenitic/SUS425 ferritic stainless steels: weldment characteristics, mechanical properties, phase transformation and solidification," Metals, Jun. 2019, 9.6, 17 pages.
Kim et al., "Development of $CO_2$-Selective Polyimide-Based Gas Separation Membranes Using Crown Ether and Polydimethylsiloxane," Polymers, 2021, 13:1927, 15 pages.
Koyanagi et al., "Movable Cross-Linked Polymeric Materials from Bulk Polymerization of Reactive Polyrotaxane Cross-Linker with Acrylate Monomers," Macromolecules 2017, 50:5695-5700, 6 pages.
Kuo et al., "Bonding behavior of repair material using fly-ash/ground granulated blast furnace slag-based geopolymer," Materials, Jan. 2019, 12.10, 16 pages.
Ladva et al., "The Cement-to-Formation Interface in Zonal Isolation," IADC/SPE 88016, Society of Petroleum Engineers (SPE), presented at the IADC/SPE Asia Pacific Drilling Technology Conference and Exhibition in Kuala Lumpur, Malaysia, Sep. 13-15, 2004, 369-382, 14 pages.
Levenfeld et al., "Effect of residual carbon on the sintering process of M2 high speed steel parts obtained by a modified metal injection molding process," Metallurgical and Materials Transactions, Jun. 2002, A:33.6 (1843-1851), 9 pages.
Lewis et al., "Direct ink writing of three-dimensional ceramic structures," Journal of the American Ceramic Society, Dec. 2006, 89.12:3599-3609, 11 pages.
Li et al., "Contamination of Cement Slurries with Diesel-Based Drilling Fluids in a Shale Gas Well," J. Nat. Gas Sci. Eng., Aug. 2015, 27:1312-1320, 9 pages.
Li et al., "Residual stress in metal additive manufacturing," Procedia Cirp, Jan. 2018, 71:348-353, 6 pages.
Li et al., "Slide-ring shape memory polymers with movable cross-links," React. Funct. Polym., 2017, 119:26-36, 25 pages.
Lin et al., "Rapid macroscale shape morphing of 3D-printed polyrotaxane monoliths amplified from pH-controlled nanoscale ring motions," J. Mater. Chem., 2018, C:6 (11956), 5 pages.
Lin et al., "Ring Shuttling Controls Macroscopic Motion in a Three-Dimensional Printed Polyrotaxane Monolith," Chem. Int. Ed., 2017, 56:4452-4457, 7 pages.
Liu et al., "A novel method to evaluate cement shale bond strength," SPE-173802-MS, Society of Petroleum Engineers (SPE), presented at the SPE International Symposium on Oilfield Chemistry, The Woodlands, Texas, Apr. 13-15, 2015, 20 pages.
Liu et al., "Graphene Lubricant," Applied Materials Today, 2020, 20:2020 (100662), 31 pages.
Luo et al., "A survey of finite element analysis of temperature and thermal stress fields in powder bed fusion additive manufacturing," Additive Manufacturing, May 2018, 21:318-332, 15 pages.
Mather et al., "Michael addition reactions in macromolecular design for emerging technologies," Progress in Polymer Science, May 2006, 31.5:487-531, 45 pages.
Mayumi et al., "Structure and dynamics of polyrotaxane and slide-ring materials," Polymer, 2010, 51:959-967, 9 pages.
Mikhalchan et al., "Aligned carbon nanotube-epoxy composites: the effect of nanotube organization on strength, stiffness, and toughness," J. Mater. Sci., 2016, 51:10005-10025, 21 pages.
Mostafaei et al., "Binder jet 3D printing—Process parameters, materials, properties, modeling, and challenges," Progress in Materials Science, Jun. 2021, 119:100707, 141 pages.
Nakahata et al., "Self-Healing Materials Formed by Cross-Linked Polyrotaxanes with Reversible Bonds," Chem, 2016, 1:5 (766-775), 11 pages.
Nelson and Guillot, "Well Cementing," Second Edition, Schlumberger, 2006, 807 pages.
Obayi et al., "Effect of grain sizes on mechanical properties and biodegradation behavior of pure iron for cardiovascular stent application," Biomatter, Jan. 2016, 6.1:e959874, 10 pages.
Ohm et al., "Liquid Crystalline Elastomers as Actuators and Sensors," Advanced Materials, Aug. 2010, 22: 3366-3387, 22 pages.
Oliveira et al., "Processing parameters in laser powder bed fusion metal additive manufacturing," Materials & Design, Aug. 2020, 193, 12 pages.
Opedal et al., "Experimental study on the cement-formation bonding," SPE 168138, Society of Petroleum Engineers (SPE), presented at the SPE International Symposium and Exhibition on Formation Damage Control, Lafayette, Louisiana, Feb. 26-28, 2014, 12 pages.
Peerzada et al., "Additive Manufacturing of Epoxy Resins: Materials, Methods, and Latest Trends," Ind. Eng. Chem. Res., 2020, 59:14, 52 pages.
Prabhakar et al., "Enhancing the Gel Transition Time and Right-Angle-Set Property of Oil Well Cement Slurries by Incorporating

(56) References Cited

OTHER PUBLICATIONS

CSA Cement and Gypsum," IPTC-19224-MS, International Petroleum Technology Conference, Mar. 2019, 12 pages.
Prajapati et al., "Measurement of anisotropic thermal conductivity and inter-layer thermal contact resistance in polymer fused deposition modeling (FDM)," Additive Manufacturing, May 2018, 21:84-90, 7 pages.
Pruksawan et al., "Homogeneously Dispersed Polyrotaxane in Epoxy Adhesive and Its Improvement in the Fracture Toughness," Macromolecules, 2019, 52:2464-2475, 12 pages.
Radonjic and Oyibo, "Experimental evaluation of wellbore cement-formation shear bond strength in presence of drilling fluid contamination," International Conference on Porous Media and Their Applications in Science, Engineering and Industry, Hawaii, Jun. 24, 2014, 7 pages.
Ramsdale-Capper et al., "Internal antiplasticisation in highly cross-linked amine cured multifunctional epoxy resins," Polymer, Jun. 2018, 146:321-330, 10 pages.
Reddy et al., "Relating Cement Additive Performance to Mix Water Composition for Deep Water and Salt Zone Applications," SPE-180344-MS, Society of Petroleum Engineers (SPE), SPE Deepwater Drilling and Completions Conference 2016, Sep. 2016, 20 pages.
Rimdusit et al., "Shape memory polymers from benzoxazine-modified epoxy," Smart Mater. Struct., 2013, 22:075033, 13 pages.
Roca et al., "Policy needed for additive manufacturing," Nature Materials, Aug. 2016, 15:8, 4 pages.
Saed et al., "Molecularly-engineered, 4D-Printed liquid crystal elastomer actuators," Advanced Functional Materials, 2019, 29.3, 9 pages.
Sajadi et al., "Direct ink writing of cement structures modified with nanoscale additive," Advanced Engineering Materials, Aug. 2019, 21.8:1801380, 10 pages.
Seo et al., "Development of a supramolecular accelerator simultaneously to increase the cross-linking density and ductility of an epoxy resin," Chem. Eng. J., 2019, 356:303-311, 30 pages.
Seo et al., "Enhanced Mechanical Strength, Flexibility, and Shape-Restoring Rate of a Drug-Eluting Shape-Memory Polymer by Incorporation of Supramolecular Cross-Linkers," ACS Macro Lett., 2020, 9:389-395, 7 pages.
Simao et al., "Cementing Solutions for Salt- and $CO_2$-Laden Presalt Zones," SPE-180336-MS, Society of Petroleum Engineers (SPE), SPE Deepwater Drilling and Completions Conference Proceedings, Sep. 2016, 11 pages.
Singh et al., "Powder bed fusion process in additive manufacturing: An overview," Materials Today: Proceedings, Jan. 2020, 26:3058-3070, 13 pages.
Snow et al., "Invited Review Article: Review of the formation and impact of flaws in powder bed fusion additive manufacturing," Additive Manufacturing, Jul. 2020, 15 pages.
Soto et al., "Self-assembly of a supramolecular network with pseudo-rotaxane cross-linking nodes and its transformation into a mechanically locked structure by rotaxane formation," Chemical Communications, 2016, 52:14149, 5 pages.
Sun et al., "Short-aramid-fiber toughening of epoxy adhesive joint between carbon fiber composites and metal substrates with different surface morphology," Compos. Part B Eng., 2015, 77:38-45, 30 pages.
Tagliaferri et al., "Direct ink writing of energy materials," Materials Advances, 2021, 2.2:540-563, 24 pages.
Tao et al., "A Brief Review of Gas Migration in Oilwell Cement Slurries," Energies, 2021, 14:2369, 22 pages.
Telschow et al., "Cement Formation—A Success Story in a Black Box: High Temperature Phase Formation of Portland Cement Clinker," Industrial & Engineering Chemistry Research (I&EC Research), American Chemical Society (ACS Publications), Jul. 2012, 51:34 (10983-11004), 22 pages.
Tong et al., "Committed Emissions from Existing Energy Infrastructure Jeopardize 1.5° C. Climate Target," Nature, 2019, 572:7769 (373-377), 17 pages.
Tran et al., "3D printing of highly pure copper," Metals, Jul. 2019, 9.7:756, 24 pages.
Ürk et al., "Structure-controlled growth of vertically-aligned carbon nanotube forests using iron-nickel bimetallic catalysts," Materials Advances, 2021, 2:2021-2030, 10 pages.
Utela et al., "A review of process development steps for new material systems in three dimensional printing (3DP)," Journal of Manufacturing Processes, Jul. 2008, 10.2:96-104, 9 pages.
Vyavahare et al., "Fused deposition modelling: A review," Rapid Prototyping Journal, Jan. 2020, 26 pages.
Wang et al., "Molecular Simulation of $CO_2$/$CH_4$ Competitive Adsorption on Shale Kerogen for $CO_2$ Sequestration and Enhanced Gas Recovery," J. Phys. Chem. C, 2018, 122:30 (17009-17018), 29 pages.
Wang et al., "Relaxation and Reinforcing Effects of Polyrotaxane in an Epoxy Resin Matrix," Macromolecules, 2006, 39:3 (1046-1052), 7 pages.
Welch et al., "Shear strength and permeability of the cement-casing interface," International Journal of Greenhouse Gas Control, Apr. 2020, 95, 29 pages.
Wenz et al., "Cyclodextrin Rotaxanes and Polyrotaxanes," Chem. Rev., 2006, 106:782-817, 36 pages.
Wimpenny et al., "Advances in 3D printing & additive manufacturing technologies," Singapore: Springer, 2017, 195 pages.
Wu et al., "A Crown Ether-Containing Copolyimide Membrane with Improved Free Volume for $CO_2$ Separation," Industrial & Engineering Chemical Research, 2019, 58:14357-14367, 44 pages.
Wu et al., "High-strain slide-ring shape-memory polycaprolactone-based polyurethane," Soft Matter, 2018, 14:4558, 28 pages.
Yakovlev et al., "Modification of Cement Matrix Using Carbon Nanotube Dispersions and Nanosilica," Science Direct, Procedia Engineering, Modern Building Materials, Structures and Techniques, MBMST 2016, 2017, 172:1261-1269, 9 pages.
Zhan et al., "In situ-grown carbon nanotubes enhanced cement-based materials with multifunctionality," Cement and Concrete Composites, Apr. 2020, 108:103518, 11 pages.
Zhang et al., "Dibenzo-21-crown-7-ether contained 6FDA-based polyimide membrane with improved gas selectivity," Separation and Purification Technology, 2021, 264:118454, 13 pages.
Zhang et al., "Three-Dimensional Printing of Continuous Flax Fiber-Reinforced Thermoplastic Composites by Five-Axis Machine," Materials, 2020, 13:1678, 11 pages.
Zoback, "Reservoir geomechanics," Cambridge University Press, 2010, 2 pages.

\* cited by examiner

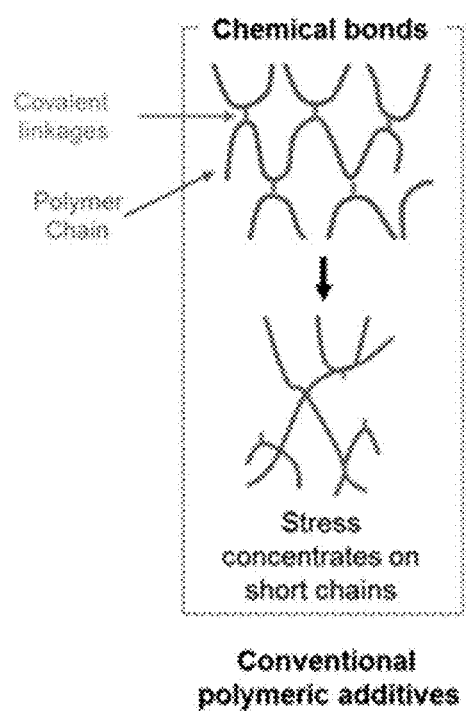
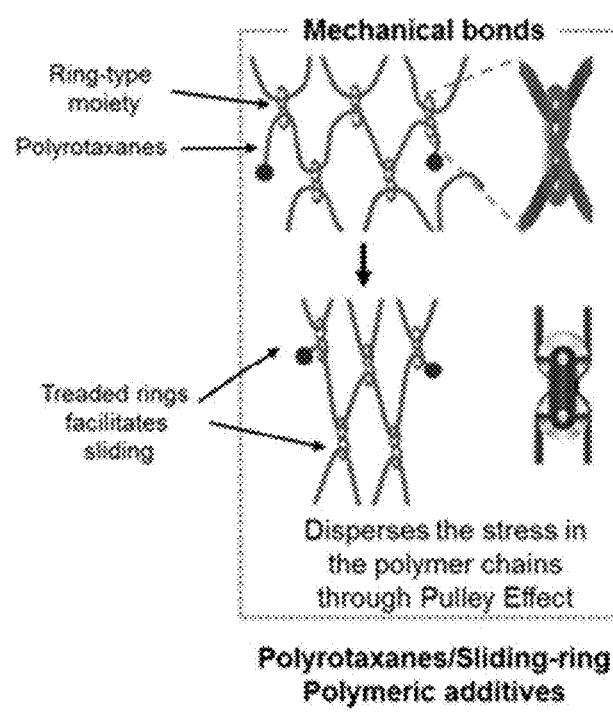
FIG. 1A
FIG. 1B

Acrylate terminated polyrotaxanes (PRA)    Cross-linked polyrotaxane beads (PRB)

FIG. 13A
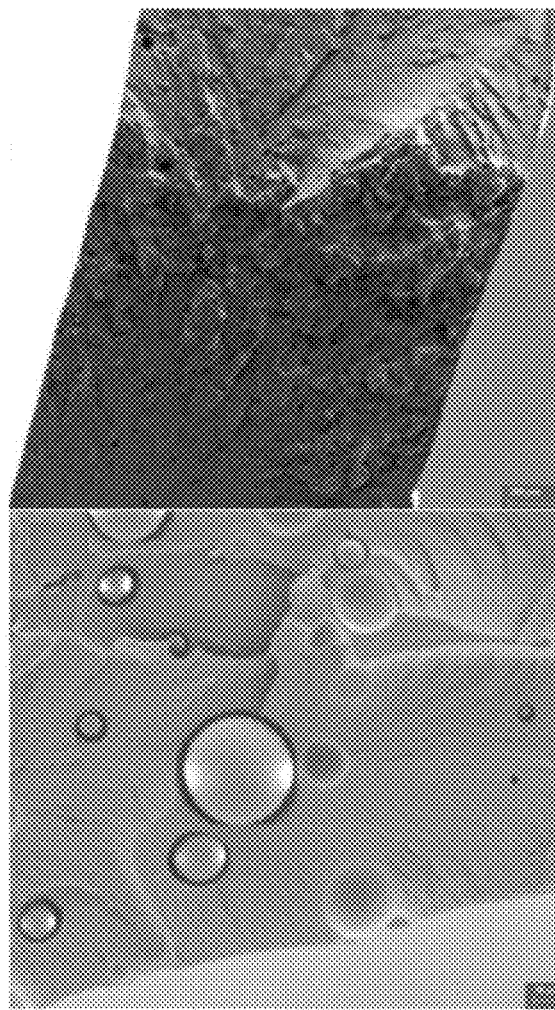
FIG. 13B
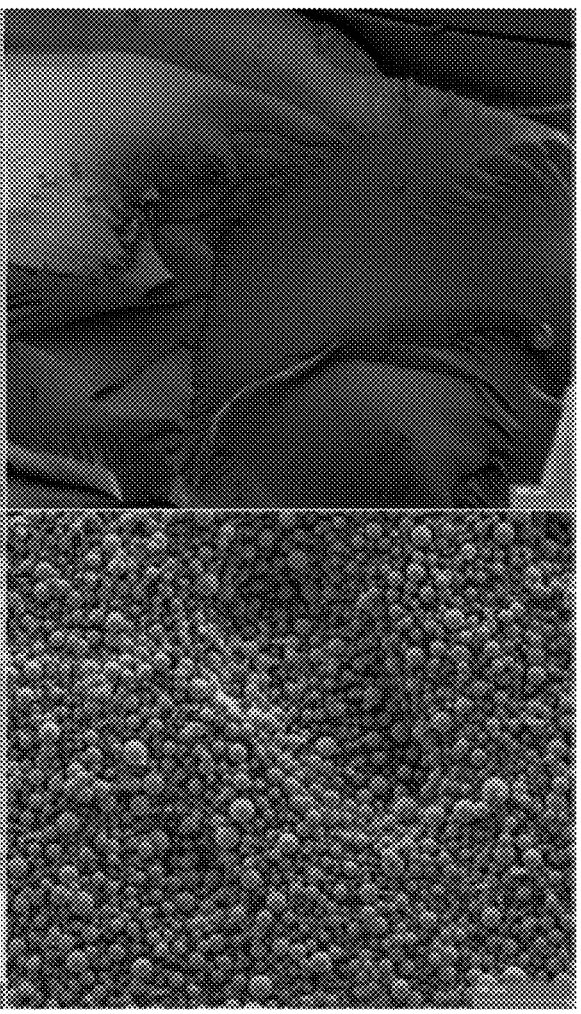
FIG. 13C
FIG. 13D

3D-PRINTED POLYROTAXANE ADDITIVES AND COMPOSITIONS

TECHNICAL FIELD

This disclosure describes sealant compositions, including 3D-printed compositions, containing a sliding-ring polymer (polyrotaxane) additive and a polymeric matrix material and methods of improving the mechanical properties of the compositions.

BACKGROUND

During the primary well cementing process, cement is placed in the annulus between the rock formations of the wellbore and the steel casing in order to provide an impermeable seal and achieve zonal isolation. Complete and durable zonal isolation, or preventing the flow of fluids between zones in the well, is the foremost goal of cementing. The quality of the cement work has a direct impact on the economic longevity of the well throughout the life of producing oil and gas and the efficacy of the primary cementing operation is governed by the well production and performance over the life of the well. It is estimated that about 15% of primary cementing jobs fail, costing the petroleum industry over USD 450 million annually in the repairing of the cement sheath through a process of cement squeezing. Several precautions have been implemented to avoid failure in the cement, such as variations in the procedure for placing the cement, incorporation of additives to improve the curing behavior, changes in the composition of the Portland cement, and blending elastic materials. However, these precautions are often unable to overcome the failure in the oil well cement sheath.

These shortcomings are not unique to cement. The stress distribution in polymers and polymeric materials has also been a significant area in which to introduce shock absorption and impact resistance properties. Thus, there is a need for composite compositions, such as sealant compositions, cement compositions, or polymeric compositions, with improved mechanical properties, such as compositions containing cement or another polymeric matrix material.

SUMMARY

Provided in the present disclosure is a sealant composition, such as a 3D-printed sealant composition, and a method for preparing a 3D-printed sealant composition. In some embodiments, the sealant composition contains a polymeric matrix material and a sliding-ring polymer additive containing at least two molecules of a polyrotaxane, where the polyrotaxane contains a linear polymer; at least one ring compound, where the linear polymer is threaded through the opening of the ring compound; and stopper groups disposed at both end terminals of the linear polymer.

In some embodiments of the sealant composition, the polymeric matrix material is selected from the group consisting of cement, a polymeric material, and polyurethane. In some embodiments, the polymeric matrix material is an epoxy resin. In some embodiments, the epoxy resin is present in an amount of about 50 wt % to about 95 wt %, about 55 wt % to about 95 wt %, about 60 wt % to about 90 wt %, about 65 wt % to about 90 wt %, about 75 wt % to about 85 wt %, or about 80 wt % to about 85 wt % of the sealant composition. In some embodiments, the epoxy resin is a UV-cured epoxy resin.

In some embodiments of the sealant composition, the sliding-ring polymer additive is an acrylate-terminated polyrotaxane. In some embodiments, the sliding-ring polymer additive is cross-linked polyrotaxane beads. In some embodiments, the cross-linked polyrotaxane beads are surface-functionalized with epoxide rings. In some embodiments, the sliding-ring polymer additive is present in an amount of about 1 wt % to about 25 wt %, about 1 wt % to about 15 wt %, about 2 wt % to about 10 wt %, about 2.5 wt % to about 5 wt %, about 5 wt % to about 20 wt %, or about 10 wt % to about 15 wt % of the sealant composition.

In some embodiments, the sealant composition comprising an additive. In some embodiments, the additive is present in an amount of about 5 wt % to about 30 wt %, about 10 wt % to about 25 wt %, or about 15 wt % to about 20 wt % of the sealant composition.

In some embodiments of the sealant composition, the additive is a curing agent. In some embodiments, the curing agent is an etheramine or an aliphatic or aromatic diamine, triamine, tetraamine, or combinations thereof. In some embodiments, the epoxy resin and the curing agent are present in a ratio of about 75:25.

In some embodiments of the sealant composition, the additive is fumed silica.

In some embodiments, the sealant composition is 3D-printed.

In some embodiments, the sealant composition exhibits increased strain tolerance or flexural strain as compared to the same sealant composition without the sliding-ring polymer additive.

In some embodiments, the sealant composition has a flexural modulus of about 1 gigapascal (GPa) to about 5 GPa, about 1 GPa to about 3 GPa, about 2 GPa to about 2.5 GPa, or about 2.2 GPa to about 2.3 GPa.

In some embodiments, the sealant composition has a flexural strength of about 50 megapascal (MPa) to about 120 mPa, about 50 MPa to about 100 MPa, about 60 MPa to about 90 MPa, about 70 MPa to about 80 MPa, about 60 MPa to about 120 MPa, about 70 MPa to about 100 MPa, or about 80 MPa to about 90 MPa.

In some embodiments, the sealant composition has a flexural toughness of about 5 $J \cdot m^3$ to about 30 $J \cdot m^3$, about 6 $J \cdot m^3$ to about 27 $J \cdot m^3$, about 9 $J \cdot m^3$ to about 20 $J \cdot m^3$, about 10 $J \cdot m^3$ to about 12 $J \cdot m^3$, about 8 $J \cdot m^3$ to about 30 $J \cdot m^3$, about 10 $J \cdot m^3$ to about 20 $J \cdot m^3$, or about 12 $J \cdot m^3$ to about 16 $J \cdot m^3$.

In some embodiments, the sealant composition exhibits improved tensile strength as compared to the same composition without the sliding-ring polymer additive.

Also provided in the present disclosure is a method for preparing a 3D-printed sealant composition. In some embodiments, the method includes mixing a polymeric matrix material and a sliding-ring polymer additive containing at least two molecules of a polyrotaxane, where the polyrotaxane contains a linear polymer; at least one ring compound, where the linear polymer is threaded through the opening of the ring compound; and stopper groups disposed at both end terminals of the linear polymer; and 3D-printing the sealant composition.

In some embodiments of the method, the polymeric matrix material is an epoxy resin. In some embodiments, the epoxy resin is a UV-cured epoxy resin.

Also provided in the present disclosure is a method for enhancing the mechanical properties of a sealant composition. In some embodiments, the method includes adding a sliding-ring polymer additive to a polymeric matrix material, the sliding-ring polymer additive containing a linear polymer; at least one ring compound, where the linear polymer is threaded through the opening of the ring compound; and stopper groups disposed at both end terminals of the linear polymer. In some embodiments of the method, the polymeric matrix material is an epoxy resin.

DESCRIPTION OF DRAWINGS

FIGS. 1A-1B illustrate the mechanism of stress distribution in conventional polymeric additives (FIG. 1A) and sliding-ring polymer additives (FIG. 1B).

FIGS. 13A-13D depict scanning electron micrographs of epoxy-PRB.

DETAILED DESCRIPTION

Figure 2:
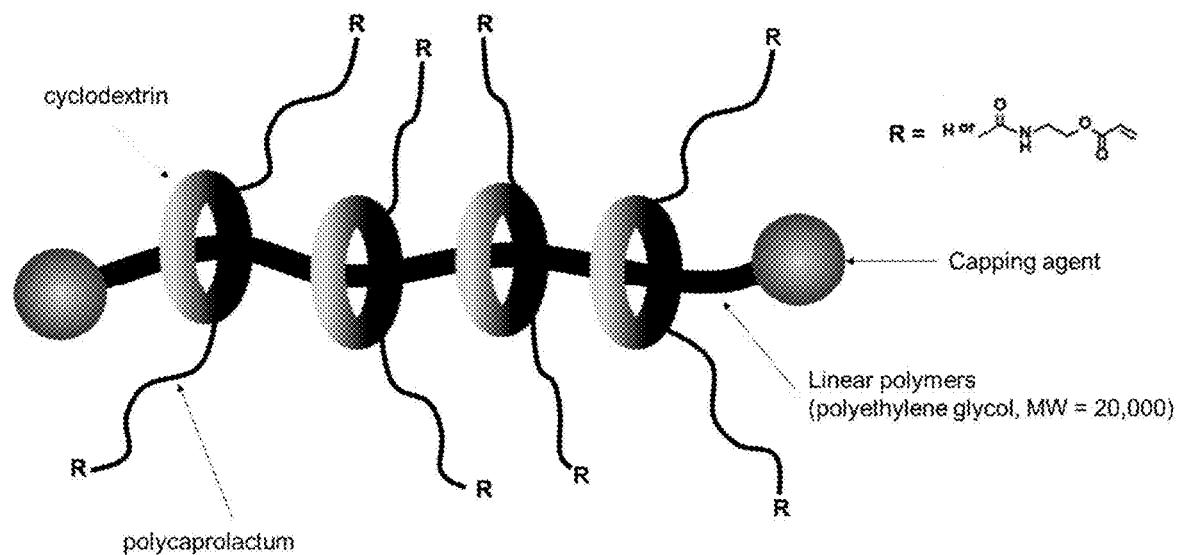
FIG. 2 represents a generalized structure of a polyrotaxane.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

The present disclosure provides sealant compositions containing a sliding-ring polymer (polyrotaxane) additive and a polymeric matrix material. In some embodiments, the polymeric matrix is a 3D-printed polymeric matrix containing a polyrotaxane additive. In some embodiments, the polyrotaxane additive enhances the mechanical properties of the sealant composition. Exemplary polymeric matrix materials include, but are not limited to, cement, epoxy resin, polyurethane, and combinations thereof.

The sealant compositions of the present disclosure contain sliding-ring polymer additives that include chemical structures called polyrotaxanes. The polyrotaxanes are made up of a linear polymer, a modified or substituted ring compound, and stopper groups on the end terminals of the linear polymer. In some embodiments, at least two molecules of the polyrotaxane are cross-linked to each other through a chemical bond. In some embodiments, the polyrotaxane forms a necklace-like structure. In some embodiments, the cyclic ring rotates, slides, or a combination thereof, upon application of external forces. In some embodiments, the rotation, sliding, or combination thereof provides for structural rearrangements. The cross-linked mechanical bond is movable, which allows the polymer chains to slide within the material. This is unlike conventional polymeric additives that contain permanently-linked covalent bonds that restrict the motion of the polymer chains. In some embodiments, the polymeric additives have chemical bonds and crosslinking that do not break down upon repeated cycling of stresses, such as due to the uneven distribution of the stresses.

The polyrotaxane additives of the present disclosure contain pulley-like crosslinks in its polymeric network. Without wishing to be bound by any particular theory, it is believed that the incorporation of molecular pulleys within the polyrotaxane additive has an analogous effect to the pulley principle on a macroscopic scale, where the force required to lift an object directly or without a pulley is greater than the force required to lift the same object with a system of pulleys. In some embodiments, a gram of the polymeric material of the present disclosure is reinforced with many trillions of molecular pulleys, which are designed to redistribute load. In some embodiments, cyclic molecules are installed at the crosslinks of the polymer network in the additive. In some embodiments, when forces are applied to this type of mechanically-linked polymer network, the stress is not concentrated on short linkages; rather, it is uniformly distributed throughout the matrix. Thus, these sliding motions at the molecular level can act as molecular machines in the polymeric matrix material and enable elastic behavior.

Without wishing to be bound by any particular theory, it is believed that the functional groups on the surface of the ring compounds, for example, hydroxyl groups (—OH) or epoxide groups on a cyclodextrin, allow for strong bonding between polymer matrix particles and the sliding-ring polymers, providing a strong interface within the polymer matrix. Furthermore, mechanical linkages (movement of ring components within polymeric networks) facilitate distribution of forces unlike chemical linkages (restricted movement of polymer chains in polymer networks) where cleavage of bonds can occur due to repeated cycles of forces.

In addition to enhancing stress distribution in the polymeric matrix material, the sliding-ring polymeric additives provide the ability to resist the failure of the mechanical properties of a sealant, such as set cement or epoxy. As shown in FIG. 1A, the cross-links between polymeric chains of traditional covalently linked polymeric additives eventually break under repeated stress under downhole conditions, as the stresses are concentrated on the short chains. By contrast, as shown in FIG. 1B, the mechanical cross-links of the presently disclosed sliding-ring polymer structures remain intact after experiencing stress. The molecular level effects originating from the sliding motion through threaded rings, a pulley effect, result in uniform dispersion of stresses in the polymeric matrix material. The blending of sliding-ring polymers in the matrix imparts the improvement in the mechanical properties, especially stiffness. Due to the sliding motion of the polyrotaxanes, the addition of these additives into a sealant compositions thus improves the distribution of stresses throughout the matrix.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used herein, the term "polyrotaxane" refers to a compound having cyclic molecules, a linear molecule included in the cyclic molecules such that the linear molecule is threaded through the cyclic molecules. In some embodiments, there are stopper groups disposed at both ends of the linear molecule so as to prevent the cyclic molecules from separating from the linear molecule. The cyclic molecules can move along the axle.

As used in this disclosure, a "cement" is a binder, for example, a substance that sets and forms a cohesive mass with measurable strengths. A cement can be characterized as non-hydraulic or hydraulic. Non-hydraulic cements (for example, Sorel cements) harden because of the formation of complex hydrates and carbonates, and may require more than water to achieve setting, such as carbon dioxide or mixtures of specific salt combinations. Additionally, too much water cannot be present, and the set material must be kept dry in order to retain integrity and strength. A non-hydraulic cement produces hydrates that are not resistant to water. Hydraulic cements (for example, Portland cement) harden because of hydration, which uses only water in addition to the dry cement to achieve setting of the cement. Cement hydration products, chemical reactions that occur independently of the mixture's water content, can harden even underwater or when constantly exposed to wet weather. The chemical reaction that results when the dry cement powder is mixed with water produces hydrates that are water-soluble. Any cement can be used in the compositions of the present application.

As used in this disclosure, the term "set" can mean the process of a fluid slurry (for example, a cement slurry) becoming a hard solid. Depending on the composition and the conditions, it can take just a few minutes up to 72 hours or longer for some sealant compositions to initially set.

"Mechanical properties" of a polymeric matrix material or sealant composition refer to the properties that contribute to the overall behavior of the material or composition when subjected to an applied force, for example, the frequent stresses cement is exposed to that impact its ability to both protect the casing and maintain zonal isolation. Mechanical properties include, but are not limited to, tensile strength, strain tolerance, flexural modulus, flexural strength.

"Flexural strain," as used herein, refers to the nominal fractional change in the length of an element of the outer surface of the test specimen at midspan, where the maximum strain occurs. Flexural strain is represented as a ratio. Flexural strain can also be referred to as "strain tolerance."

The term "flexural modulus," as used herein, refers to the ratio of stress to strain in a flexural deformation of a material.

The term "flexural strength," as used herein, refers to the maximum bending stress that the test specimen can sustain before it yields.

"Flexural toughness," as used herein, is a measure of energy absorption capacity and characterization of material's ability to resist fracture under flexure loads.

The term "tensile strength," as used in this disclosure, describes the ability of the sealant composition to resist breaking while being subjected to tension forces. "Improved tensile properties" means an increase in the tensile strength of the sealant composition being referred to.

As used in this disclosure, "zonal isolation" means the prevention of fluids, such as water or gas, in one zone of a well or subterranean formation, from mixing with oil in another zone.

The term "downhole," as used in this disclosure, can refer to under the surface of the earth, such as a location within or fluidly connected to a wellbore.

As used in this disclosure, the term "subterranean formation" can refer to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region that is in fluid contact with the wellbore. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground that is in fluid contact with liquid or gaseous petroleum materials or water. In some embodiments, a subterranean formation is an oil well.

Sealant Compositions Containing Sliding-Ring Polymers

Provided in this disclosure is a sealant composition containing a polymeric matrix material and a sliding-ring polymer additive, for example, a sliding-ring polymer additive of the present disclosure, that exhibits improved mechanical properties, for example, improved strain tolerance, improved toughness, improved tensile properties, or combinations thereof, as compared to the same sealant composition that does not contain the sliding-ring polymer additive.

Sliding-Ring Polymer Additives

Provided in this disclosure are sliding-ring polymer additives that are made up of at least two molecules of a polyrotaxane that are cross-linked to each other through a chemical bond, where the polyrotaxane contains a linear polymer and at least one ring compound, where the linear polymer is threaded through the opening of the ring compound, and stopper groups disposed at both end terminals of the linear polymer. In some embodiments, at least one of the linear polymer and the ring compound is substituted with a hydrophobic or non-ionic group or combination thereof.

Sliding-ring polymers are produced through host-guest chemical routes. In this approach, ring-type organic compounds are loaded on to a linear polymeric chain and the inclusion or threaded compounds obtained are subjected to the end-capping by bulkier chemical moieties to restrict the ring-type compounds from de-thread. The materials obtained are called polyrotaxanes. In some embodiments, the surfaces of the ring-type compounds in polyrotaxanes are chemically modified so that they can be cross-linked with high molecular weight polymeric materials, to generate sliding-ring polymers.

Any sliding-ring polymer known in the art can be used as an additive in the sealant compositions of the present disclosure. For example, any sliding-ring polymer that improves the elastic properties of a polymeric matrix material can be used. In some embodiments, the sliding-ring polymer additive is a sliding-ring polymer additive as described in the present disclosure, for example, a sliding-ring polymer additive that includes at least two molecules of a polyrotaxane that are made up of a linear polymer, at least one ring compound, and stopper groups disposed at the end terminals of the linear polymer. In some embodiments, the sliding-ring polymer additive is an additive or polyrotaxane moiety as described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

Commercially available sliding-ring polymers can also be used in the sealant compositions of the present disclosure. In some embodiments, the sliding-ring polymer additive is a sliding-ring polymer or polyrotaxane manufactured by Nagase America Corporation (New York, New York). Other examples of commercially available sliding-ring polymer additives are sliding-ring polymers or polyrotaxanes manufactured by Advanced Softmaterials Inc. (Chiba, Japan).

Linear Polymers

The linear polymer that can be included in a polyrotaxane can be any linear polymer that can be included in a ring compound such that the linear polymer is threaded through the opening of the ring compound. Any linear polymer that can be threaded through the opening of a ring compound can be included in a polyrotaxane. Examples of such linear polymers include those described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

Examples of the suitable linear polymers include, but are not limited to, polyvinyl alcohol, polyvinylpyrrolidone, poly (meth)acrylic acid, cellulose-based resins (for example, carboxymethylcellulose, hydroxyethylcellulose, and hydroxypropylcellulose), polyacrylamide, polyethylene oxide, polyethylene glycol, polypropylene glycol, polyvinyl acetal-based resins, polyvinyl methyl ether, polyamine, polyethyleneimine, casein, gelatin, starch and copolymers thereof, polyolefin-based resins (for example, polyethylene, polypropylene, and copolymer resins with other olefinic monomers), polyester resins, polyvinyl chloride resins, polystyrene-based resins (for example, polystyrene and acrylonitrile-styrene copolymer resin), acrylic resins (for example, polymethyl methacrylate, copolymers of (meth) acrylate, acrylonitrile-methyl acrylate copolymer resin), polycarbonate resins, polyurethane resins, vinyl chloride-vinyl acetate copolymer resin, polyvinylbutyral resin, polyisobutylene, polytetrahydrofuran, polyaniline, acrylonitrile-butadiene-styrene copolymer (ABS resin), polyamides (for example, nylon), polyimides, polydienes (for example, polyisoprene and polybutadiene), polysiloxanes (for example, polydimethylsiloxane), polysulfones, polyimines, polyacetic anhydrides, polyureas, polysulfides, polyphosphazenes, polyketones, polyphenylenes, polyhaloolefins; and copolymer and derivatives thereof. In some embodiments, the linear polymer is selected from the group consisting of polypropylene glycol, polytetrahydrofuran, polydimethylsiloxane, polyethylene and polypropylene. In some embodiments, the linear polymer is polyethylene glycol.

In some embodiments, the linear molecule has a molecular weight of about 2000 g/mol to about 50,000 g/mol, for example, about 2000 g/mol to about 45,000 g/mol, about 2000 g/mol to about 40,000 g/mol, about 2000 g/mol to about 35,000 g/mol, about 2000 g/mol to about 30,000 g/mol, about 2000 g/mol to about 25,000 g/mol, about 2000 g/mol to about 20,000 g/mol, about 2000 g/mol to about 15,000 g/mol, about 2000 g/mol to about 10,000 g/mol, about 2000 g/mol to about 8000 g/mol, about 2000 g/mol to about 5000 g/mol, about 5000 g/mol to about 50,000 g/mol, about 5000 g/mol to about 45,000 g/mol, about 5000 g/mol to about 40,000 g/mol, about 5000 g/mol to about 35,000 g/mol, about 5000 g/mol to about 30,000 g/mol, about 5000 g/mol to about 25,000 g/mol, about 5000 g/mol to about 20,000 g/mol, about 5000 g/mol to about 15,000 g/mol, about 5000 g/mol to about 10,000 g/mol, about 5000 g/mol to about 8000 g/mol, about 8000 g/mol to about 50,000 g/mol, about 8000 g/mol to about 45,000 g/mol, about 8000 g/mol to about 40,000 g/mol, about 8000 g/mol to about 35,000 g/mol, about 8000 g/mol to about 30,000 g/mol, about 8000 g/mol to about 25,000 g/mol, about 8000 g/mol to about 20,000 g/mol, about 8000 g/mol to about 15,000 g/mol, about 8000 g/mol to about 10,000 g/mol, about 10,000 g/mol to about 50,000 g/mol, about 10,000 g/mol to about 45,000 g/mol, about 10,000 g/mol to about 40,000 g/mol, about 10,000 g/mol to about 35,000 g/mol, about 10,000 g/mol to about 30,000 g/mol, about 10,000 g/mol to about 25,000 g/mol, about 10,000 g/mol to about 20,000 g/mol, about 10,000 g/mol to about 15,000 g/mol, about 15,000 g/mol to about 50,000 g/mol, about 15,000 g/mol to about 45,000 g/mol, about 15,000 g/mol to about 40,000 g/mol, about 15,000 g/mol to about 35,000 g/mol, about 15,000 g/mol to about 30,000 g/mol, about 15,000 g/mol to about 25,000 g/mol, about 15,000 g/mol to about 20,000 g/mol, about 20,000 g/mol to about 50,000 g/mol, about 20,000 g/mol to about 45,000 g/mol, about 20,000 g/mol to about 40,000 g/mol, about 20,000 g/mol to about 35,000 g/mol, about 20,000 g/mol to about 30,000 g/mol, about 20,000 g/mol to about 25,000 g/mol, about 25,000 g/mol to about 50,000 g/mol, about 25,000 g/mol to about 45,000 g/mol, about 25,000 g/mol to about 40,000 g/mol, about 25,000 g/mol to about 35,000 g/mol, about 25,000 g/mol to about 30,000 g/mol, about 30,000 g/mol to about 50,000 g/mol, about 30,000 g/mol to about 45,000 g/mol, about 30,000 g/mol to about 40,000 g/mol, about 30,000 g/mol to about 35,000 g/mol, about 35,000 g/mol to about 50,000 g/mol, about 35,000 g/mol to about 45,000 g/mol, about 35,000 g/mol to about 40,000 g/mol, about 40,000 g/mol to about 50,000 g/mol, about 40,000 g/mol to about 45,000 g/mol, about 45,000 g/mol to about 50,000 g/mol, or about 2000 g/mol, about 5000 g/mol, about 8000 g/mol, about 10,000 g/mol, about 15,000 g/mol, about 20,000 g/mol, about 25,000 g/mol, about 30,000 g/mol, about 35,000 g/mol, about 40,000 g/mol, about 45,000 g/mol, or about 50,000 g/mol. In some embodiments, the molecular weight of the linear molecule is about 2000 g/mol to about 50,000 g/mol. In some embodiments, the molecular weight of the linear molecule is about 8000 g/mol to about 30,000 g/mol. In some embodiments, the molecular weight of the linear molecule is about 15,000 g/mol to about 25,000 g/mol. In some embodiments, the molecular weight of the linear molecule is greater than about 10,000 g/mol. In some embodiments, the molecular weight of the linear molecule is greater than about 20,000 g/mol. In some embodiments, the molecular weight of the linear molecule is greater than about 35,000 g/mol.

Ring Compounds

The ring compound that can be included in a polyrotaxane can be any ring compound that allows for threading of a linear polymer through the opening of the ring. Examples of such ring compounds include those described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

In some embodiments, the ring compound comprises one or more of an —OH group, an —NH$_2$ group, a —COOH group, an epoxy group, a vinyl group, a thiol group, a photo-crosslinkable group, and combinations thereof. In some embodiments, the photo-crosslinkable group is selected from the group consisting of cinnamic acid, coumarin, chalcone, anthracene, styrylpyridine, styrylpyridinium salt, and styrylquinolium salt.

In some embodiments, the ring compound is a cyclodextrin or a cyclodextrin derivative. Examples of suitable ring compounds include, but are not limited to, α-cyclodextrin (α-CD), β-cyclodextrin (β-CD), γ-cyclodextrin (γ-CD), and derivatives thereof. Cyclodextrin derivatives are compounds obtained by substituting hydroxyl groups of cyclodextrin with polymer chains, substituents, or both. Examples of suitable polymer chains include, but are not limited to, polyethylene glycol, polypropylene glycol, polyethylene, polypropylene, polyvinyl alcohol, polyacrylate, polylactone, and polylactam. Examples of suitable substituents include, but are not limited to, hydroxyl, thionyl, amino, sulfonyl, phosphonyl, acetyl, alkyl groups (for example, methyl, ethyl, propyl, and isopropyl), trityl, tosyl, trimethylsilane, and phenyl.

Examples of suitable cyclodextrin and cyclodextrin derivatives include, but are not limited to, α-cyclodextrin (the number of glucose residues=6, inner diameter of opening=about 0.45 to 0.6 μm), β-cyclodextrin (the number of glucose residues=7, inner diameter of opening=about 0.6 to 0.8 μm), γ-cyclodextrin (the number of glucose residues=8, inner diameter of opening=about 0.8 to 0.95 μm), dimethyl cyclodextrin, glucosyl cyclodextrin, 2-hydroxypropyl-α-cyclodextrin, 2,6-di-O-methyl-α-cyclodextrin 6-O-α-maltosyl-α-cyclodextrin, 6-O-α-D-glucosyl-α-cyclodextrin, hexakis(2,3,6-tri-O-acetyl)-α-cyclodextrin, hexakis(2,3,6-tri-O-methyl)-α-cyclodextrin, hexakis(6-O-tosyl)-α-cyclodextrin, hexakis(6-amino-6-deoxy)-α-cyclodextrin, hexakis(2,3-acetyl-6-bromo-6-deoxy)-α-cyclodextrin, hexakis(2,3,6-tri-O-octyl)-α-cyclodextrin, mono(2-O-phosphoryl)-α-cyclodextrin, mono[2,(3)-O-(carboxylmethyl)]-α-cyclodextrin, octakis(6-O-t-butyldimethylsilyl)-α-cyclodextrin, succinyl-α-cyclodextrin, glucuronyl glucosyl-β-cyclodextrin, heptakis(2,6-di-O-methyl)-β-cyclodextrin, heptakis(2,6-di-O-ethyl)-β-cyclodextrin, heptakis(6-O-sulfo)-β-cyclodextrin, heptakis(2,3-di-O-acetyl-6-O-sulfo)β-cyclodextrin, heptakis(2,3-di-O-methyl-6-O-sulfo)-β-cyclodextrin, heptakis(2,3,6-tri-O-acetyl)-β-cyclodextrin, heptakis(2,3,6-tri-0-benzoyl)-β-cyclodextrin, heptakis(2,3,6-tri-O-methyl)β-cyclodextrin, heptakis(3-O-acetyl-2,6-di-O-methyl)-β-cyclodextrin, heptakis(2,3-O-acetyl-6-bromo-6-deoxy)-β-cyclodextrin, 2-hydroxyethyl-β-cyclodextrin, hydroxypropyl-β-cyclodextrin, 2-hydroxypropyl-β-cyclodextrin, (2-hydroxy-3-N,N,N-trimethylamino)propyl-β-cyclodextrin, 6-O-α-maltosyl-β-cyclodextrin, methyl-β-cyclodextrin, hexakis(6-amino-6-deoxy)-β-cyclodextrin, bis(6-azido-6-deoxy)-β-cyclodextrin, mono(2-O-phosphoryl)-β-cyclodextrin, hexakis[6-deoxy-6-(1-imidazolyl)]-β-cyclodextrin, monoacetyl-β-cyclodextrin, triacetyl-β-cyclodextrin, monochlorotriazinyl-β-cyclodextrin, 6-O-α-D-glucosyl-β-cyclodextrin, 6-O-α-D-maltosyl-β-cyclodextrin, succinyl-β-cyclodextrin, succinyl-(2-hydroxypropyl)β-cyclodextrin, 2-carboxymethyl-β-cyclodextrin, 2-carboxyethyl-β-cyclodextrin, butyl-β-cyclodextrin, sulfopropyl-β-cyclodextrin, 6-monodeoxy-6-monoamino-β-cyclodextrin, silyl[(6-O-t-butyldimethyl)2,3-di-O-acetyl]-β-cyclodextrin, 2-hydroxyethyl-γ-cyclodextrin, 2-hydroxypropyl-γ-cyclodextrin, butyl-γ-cyclodextrin, 3A-amino-3A-deoxy-(2AS,3AS)-γ-cyclodextrin, mono-2-O-(p-toluenesulfonyl)-γ-cyclodextrin, mono-6-O-(p-toluenesulfonyl)-γ-cyclodextrin, mono-6-O-mesitylenesulfonyl-γ-cyclodextrin, octakis(2,3,6-tri-O-methyl)-γ-cyclodextrin, octakis(2,6-di-O-phenyl)-γ-cyclodextrin, octakis(6-O-t-butyldimethylsilyl)-γ-cyclodextrin, and octakis(2,3,6-tri-O-acetyl)-γ-cyclodextrin. The ring compounds, such as the cyclodextrins listed in the present disclosure, can be used alone or in combination of two or more.

In some embodiments, the ring compound is α-cyclodextrin having the structure:

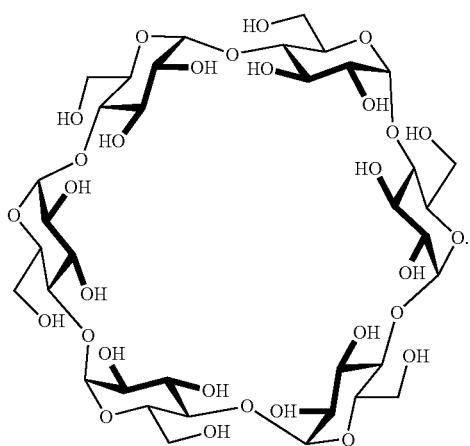 [SMILES: OCC1O[C@@H]2O[C@@H]3C(CO)O[C@H](O[C@@H]4C(CO)O[C@H](O[C@@H]5C(CO)O[C@H](O[C@@H]6C(CO)O[C@H](O[C@@H]7C(CO)O[C@H](O[C@H]1[C@H](O)[C@H]2O)[C@H](O)[C@H]7O)[C@H](O)[C@H]6O)[C@H](O)[C@H]5O)[C@H](O)[C@H]4O)[C@H](O)[C@H]3O]

In some embodiments, the ring compound is β-cyclodextrin having the structure:

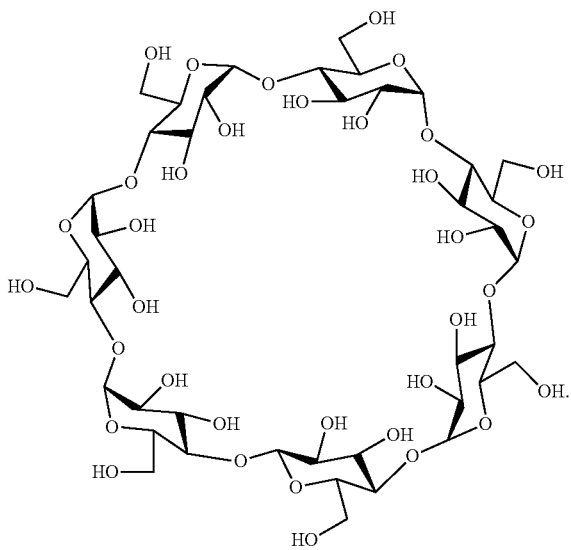 [SMILES: OCC1O[C@@H]2O[C@@H]3C(CO)O[C@H](O[C@@H]4C(CO)O[C@H](O[C@@H]5C(CO)O[C@@H](O[C@@H]6C(CO)O[C@H](O[C@@H]7C(CO)O[C@H](O[C@@H]8C(CO)O[C@H](O[C@H]1C(O)C2O)C(O)C8O)C(O)C7O)C(O)C6O)C(O)C5O)C(O)C4O)C(O)C3O]

In some embodiments, the ring compound is γ-cyclodextrin having the structure:

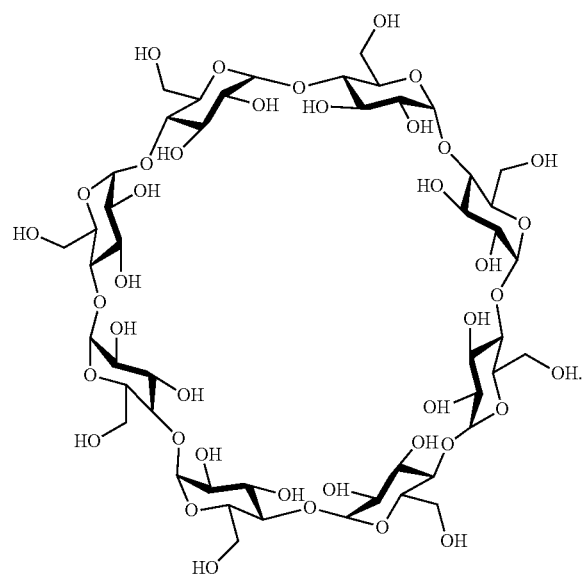 [SMILES: OCC1O[C@@H]2O[C@@H]3C(CO)O[C@H](O[C@@H]4C(CO)O[C@@H](O[C@@H]5C(CO)O[C@H](O[C@@H]6C(CO)O[C@H](O[C@@H]7C(CO)O[C@@H](O[C@@H]8C(CO)O[C@H](O[C@@H]9C(CO)O[C@H](O[C@H]1[C@H](O)C2O)C(O)[C@H]9O)C(O)[C@H]8O)C(O)[C@H]7O)C(O)[C@H]6O)C(O)[C@H]5O)C(O)[C@H]4O)C(O)[C@H]3O]

In some embodiments, the amount of ring compound, for example, a cyclodextrin or cyclodextrin derivative, on the polymer chain is about 2 wt % to about 60 wt %, such as about 2 wt % to about 55 wt %, about 2 wt % to about 50 wt %, about 2 wt % to about 45 wt %, about 2 wt % to about 40 wt %, about 2 wt % to about 35 wt %, about 2 wt % to about 30 wt %, about 2 wt % to about 25 wt %, about 2 wt % to about 20 wt %, about 2 wt % to about 15 wt %, about 2 wt % to about 10 wt %, about 2 wt % to about 5 wt %, about 5 wt % to about 60 wt %, about 5 wt % to about 55 wt %, about 5 wt % to about 50 wt %, about 5 wt % to about 45 wt %, about 5 wt % to about 40 wt %, about 5 wt % to about 35 wt %, about 5 wt % to about 30 wt %, about 5 wt % to about 25 wt %, about 5 wt % to about 20 wt %, about 5 wt % to about 15 wt %, about 5 wt % to about 10 wt %, about 10 wt % to about 60 wt %, about 10 wt % to about 55 wt %, about 10 wt % to about 50 wt %, about 10 wt % to about 45 wt %, about 10 wt % to about 40 wt %, about 10 wt % to about 35 wt %, about 10 wt % to about 30 wt %, about 10 wt % to about 25 wt %, about 10 wt % to about 20 wt %, about 10 wt % to about 15 wt %, about 15 wt % to about 60 wt %, about 15 wt % to about 55 wt %, about 15 wt % to about 50 wt %, about 15 wt % to about 45 wt %, about 15 wt % to about 40 wt %, about 15 wt % to about 35 wt %, about 15 wt % to about 30 wt %, about 15 wt % to about 25 wt %, about 15 wt % to about 20 wt %, about 20 wt % to about 60 wt %, about 20 wt % to about 55 wt %, about 20 wt % to about 50 wt %, about 20 wt % to about 45 wt %, about 20 wt % to about 40 wt %, about 20 wt % to about 35 wt %, about 20 wt % to about 30 wt %, about 20 wt % to about 25 wt %, about 25 wt % to about 60 wt %, about 25 wt % to about 55 wt %, about 25 wt % to about 50 wt %, about 25 wt % to about 45 wt %, about 25 wt % to about 40 wt %, about 25 wt % to about 35 wt %, about 25 wt % to about 30 wt %, about 30 wt % to about 60 wt %, about 30 wt % to about 55 wt %, about 30 wt % to about 50 wt %, about 30 wt % to about 45 wt %, about 30 wt % to about 40 wt %, about 30 wt % to about 35 wt %, about 35 wt % to about 60 wt %, about 35 wt % to about 55 wt %, about 35 wt % to about 50 wt %, about 35 wt % to about 45 wt %, about 35 wt % to about 40 wt %, about 40 wt % to about 60 wt %, about 40 wt % to about 55 wt %, about 40 wt % to about 50 wt %, about 40 wt % to about 45 wt %, about 45 wt % to about 60 wt %, about 45 wt % to about 55 wt %, about 45 wt % to about 50 wt %, about 50 wt % to about 60 wt %, about 50 wt % to about 55 wt %, about 55 wt % to about 60 wt %, or about 2 wt %, about 5 wt %, about 10 wt %, about 15 wt %, about 20 wt %, about 25 wt %, about 30 wt %, about 35 wt %, about 40 wt %, about 45 wt %, about 50 wt %, about 55 wt %, or about 60 wt %. In some embodiments, the amount of ring compound, for example, a cyclodextrin or cyclodextrin derivative, on the polymer chain is about 2 wt % to about 60 wt %. In some embodiments, the amount of ring compound, for example, a cyclodextrin or cyclodextrin derivative, on the polymer chain is about 10 wt % to about 50 wt %. In some embodiments, the amount of ring compound, for example, a cyclodextrin or cyclodextrin derivative, on the polymer chain is about 25 wt % to about 35 wt %.

Hydrophobic and Non-Ionic Groups

In some embodiments, at least one of the linear polymer and the ring compound is substituted (or modified) with a hydrophobic group or a non-ionic group or a combination thereof. The hydrophobic and non-ionic groups can be any group that can modify or be substituted onto a linear polymer or ring compound. Examples of such groups include those described in any one of U.S. Pat. Nos. 7,612, 142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

In some embodiments, at least one of the linear polymer and ring compound is substituted with a hydrophobic group. Examples of suitable hydrophobic groups include, but are not limited to, alkyl group, benzyl group, benzene derivative-containing group, acyl group, silyl group, trityl group, tosyl group, a polymer, and groups bonded through a urethane bond, ester bond or ether bond. In some embodiments, the polymer is a polycaprolactone.

In some embodiments, at least one of the linear polymer and ring compound is substituted with a non-ionic group. In some embodiments, the non-ionic group is selected from the group consisting of: an —OR group, wherein R is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—R'—X group, wherein R' is a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X is —OH, —NH$_2$ or —SH; an O—CO—NH—R$^1$ group, wherein R$^1$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—CO—R$^2$ group, wherein R$^2$ is a linear or branched alky 1 group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—Si—R$^3$ group, wherein R$^3$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; and an —O—CO—O—R$^4$ group, wherein R$^4$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

In some embodiments, R is selected from acrylate, methacrylate, amine, thiol, isocyanate, azide, hydroxyl, hydrogen, styrene, and combinations thereof.

Examples of R, R', R$^1$, R$^2$, R$^3$, and R$^4$ groups include, but are not limited to, alkyl groups such as methyl, ethyl, propyl, butyl, pentyl, hexyl, heptyl, octyl, nonyl, decyl, undecyl, and dodecyl; branched alkyl groups such as isopropyl, isobutyl, tert-butyl, 1-methylpropyl, isoamyl, neopentyl, 1,1-dimethylpropyl, 4-methylpentyl, 2-methylbutyl, and 2-ethylhexyl; cycloalkyl groups such as cyclopropyl, cyclobutyl, cyclopentyl, cyclohexyl, cycloheptyl, cyclooctyl, and adamantyl; cycloalkyl ether groups such as ethylene oxide, oxetane, tetrahydrofuran, tetrahydropyrane, oxepane, dioxane, and dioxolane; and cycloalkyl thioether groups such as thiirane, thietane, tetrahydrothiophene, thiane, dithiolane, and dithiane. In some embodiments, R' is a group resulting from removal of one hydrogen, for example, R' can be a group resulting from removal of one hydrogen in methyl, ethyl, propyl, butyl, pentyl or hexyl.

In some embodiments, the ring compound is substituted with a hydrophobic group, a non-ionic group, or combinations thereof. In some embodiments, the ring compound is a cyclodextrin. In some embodiments, a part or all of the hydroxyl groups (—OH) of the cyclodextrin are substituted with a hydrophobic group or non-ionic group or combination thereof. In some embodiments, a part or all of the hydroxyl groups (—OH) of the cyclodextrin are substituted with a polycaprolactone, a hydroxypropyl group, or both. In some embodiments, substitution of the hydroxyl group with the hydrophobic group or non-ionic group or combination thereof is about 10% to about 100% of the total hydroxyl groups of the total cyclodextrin molecules.

Amount of Inclusion

In some embodiments, where a plurality of ring compounds include a linear polymer such that the linear polymer is threaded through the ring compounds, when the maximum amount of inclusion of one linear polymer in the ring compound is 1, the ring compounds can include the linear polymer in an amount of 0.001 to 0.6, such as 0.01 to 0.5, or 0.05 to 0.4.

The maximum amount of inclusion in the ring compounds can be calculated from the length of the linear polymer and the thickness of the ring compounds. For example, when the linear polymer is polyethylene glycol and the ring compounds are α-cyclodextrin molecules, the maximum amount of inclusion has been experimentally determined (see, for example, Macromolecules (1993) 26:5698-5703).

Stopper Group

The polyrotaxane of the sliding-ring polymer includes stopper groups disposed at both end terminals of the linear polymer. The stopper groups can be any group that is disposed at the ends of a linear polymer and acts to prevent separation of the ring compounds. Examples of such stopper groups include those described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

Examples of suitable stopper groups include, but are not limited to, dinitrophenyl groups; cyclodextrins; adamantane groups; trityl groups; fluoresceins; pyrenes; benzenes optionally substituted with one or more substituents including, but not limited to, alkyl, alkyloxy, hydroxy, halogen, cyano, sulfonyl, carboxyl, amino, and phenyl; polycyclic aromatics optionally substituted with one or more substituents including, but not limited to, alkyl, alkyloxy, hydroxy, halogen, cyano, sulfonyl, carboxyl, amino, and phenyl; and steroids. In some embodiments, the stopper group is selected from the group consisting of dinitrophenyl groups; cyclodextrins; adamantane groups; trityl groups; fluoresceins; and pyrenes. In some embodiments, the stopper group is adamantane. In some embodiments, the stopper group is trityl.

Cross-Linkers

In some embodiments, at least two molecules of polyrotaxane are chemically bonded by a cross-linking agent. Examples of suitable cross-linking agents include those described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

Examples of suitable cross-linkers include, but are not limited to, melamine resins, polyisocyanate compounds, block isocyanate compounds, cyanuric chloride, trimesoyl chloride, terephthaloyl chloride, epichlorohydrin, dibromobenzene, formaldehyde, glutaraldehyde, phenylenediisocyanate, tolylene diisocyanate, divinylsulfone, bisphenol A diglycidyl ether, diisopropylethylenediamine, 1,1-carbonyldiimidazole, and alkoxy silanes. The cross-linkers can be used alone or in combination. In some embodiments, the cross-linker is selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole, and alkoxysilanes.

Linked Polyrotaxanes

In the sliding-ring polymer additives that can be used in the sealant compositions of the present disclosure, at least two molecules of polyrotaxane are cross-linked to each other through a chemical bond. When linking polyrotaxane molecules, all of the polyrotaxane molecules can be substituted with the same hydrophobic or non-ionic group. Alternatively, a part of the polyrotaxane molecules can be substituted with one hydrophobic or non-ionic group, and the rest of the polyrotaxane molecules can be substituted with a hydrophobic or non-ionic group that is different from the first group. Moreover, different molecules of polyrotaxane substituted with different hydrophobic or non-ionic groups can be physically linked.

In some embodiments, at least one hydroxyl group of at least one cyclic molecule in each of at least two molecules of polyrotaxane is involved in cross-linking. In some embodiments, at least two molecules of polyrotaxane are chemically bonded by a cross-linking agent.

Polymeric Matrix Material

The sealant compositions of the present application contain a polymeric matrix material. The polymeric matrix material can be any type of composite material in which the mechanical properties can be strengthened, such as that used in the construction of subterranean oil and gas wells, or any composite material used in above-ground construction applications. In some embodiments, the polymeric matrix material is selected from cement, a polymeric material, and polyurethane. In some embodiments, the polymeric matrix material is cement. In some embodiments, the cement is Portland cement. Examples of cements that can be used in the compositions include, but are not limited to Class A, Class B, Class G, and Class H cements.

In some embodiments, the polymeric matrix material is a polymeric material. In some embodiments, the polymeric material is epoxy, such as an epoxy resin. Any epoxy resin can be used in the sealant compositions of the present disclosure. An exemplary epoxy resin is EPON™ Resin 826, a low viscosity, light colored liquid bisphenol A based epoxy resin sold by Hexion Inc., Columbus, OH. In some embodiments, the polymeric matrix material is polyurethane.

Additives

The sealant compositions of the present disclosure can contain one or more additives. In some embodiments, the additive is a curing agent. Exemplary curing agents include etheramines and aliphatic and/or aromatic diamines, triamines, tetraamines, or mixtures thereof. An exemplary curing agent is JEFFAMINE®D-230 polyetheramine, a difunctional, primary amine with an average molecular weight of about 230 characterized by repeating oxypropylene units in the backbone, sold by Huntsman Corporation, The Woodlands, TX.

Sealant Composition

The sealant compositions of the present application contain a polymeric matrix material and a sliding-ring polymer additive. In some embodiments, the sealant compositions contain one or more additives. In some embodiments, the sealant compositions contain a curing agent.

In some embodiments, the amount of polymeric matrix material in the sealant composition is about 50 wt % to about 95 wt %, such as about 50 wt % to about 90 wt %, about 50 wt % to about 85 wt %, about 50 wt % to about 80 wt %, about 50 wt % to about 75 wt %, about 50 wt % to about 70 wt %, about 50 wt % to about 65 wt %, about 50 wt % to about 60 wt %, about 50 wt % to about 55 wt %, about 55 wt % to about 95 wt %, about 55 wt % to about 90 wt %, about 55 wt % to about 85 wt %, about 55 wt % to about 80 wt %, about 55 wt % to about 75 wt %, about 55 wt % to about 70 wt %, about 55 wt % to about 65 wt %, about 55 wt % to about 60 wt %, about 60 wt % to about 95 wt %, about 60 wt % to about 90 wt %, about 60 wt % to about 85 wt %, about 60 wt % to about 80 wt %, about 60 wt % to about 75 wt %, about 60 wt % to about 70 wt %, about 60 wt % to about 65 wt %, about 65 wt % to about 95 wt %, about 65 wt % to about 90 wt %, about 65 wt % to about 85 wt %, about 65 wt % to about 80 wt %, about 65 wt % to about 75 wt %, about 65 wt % to about 70 wt %, about 70 wt % to about 95 wt %, about 70 wt % to about 90 wt %, about 70 wt % to about 85 wt %, about 70 wt % to about 80 wt %, about 70 wt % to about 75 wt %, about 75 wt % to about 95 wt %, about 75 wt % to about 90 wt %, about 75 wt % to about 85 wt %, about 75 wt % to about 80 wt %, about 80 wt % to about 95 wt %, about 80 wt % to about 90 wt %, about 80 wt % to about 85 wt %, about 85 wt % to about 95 wt %, about 85 wt % to about 90 wt %, about 90 wt % to about 95 wt %, or about 50 wt %, about 55 wt %, about 60 wt %, about 65 wt %, about 70 wt %, about 75 wt %, about 80 wt %, about 85 wt %, about 90 wt %, or about 95 wt %. In some embodiments, the amount of polymeric matrix material in the sealant composition is about 50 wt % to about 95 wt %. In some embodiments, the amount of polymeric matrix material in the sealant composition is about 60 wt % to about 90 wt %. In some embodiments, the amount of polymeric matrix material in the sealant composition is about 75 wt % to about 85 wt %. In some embodiments, the amount of polymeric matrix material in the sealant composition is about 65 wt %. In some embodiments, the amount of polymeric matrix material in the sealant composition is about 70 wt %. In some embodiments, the amount of polymeric matrix material in the sealant composition is about 75 wt %. In some embodiments, the polymeric matrix material is an epoxy resin. An exemplary epoxy resin is EPON™ Resin 826 (a low viscosity, light colored liquid bisphenol A based epoxy resin sold by Hexion Inc., Columbus, OH).

In some embodiments, the amount of sliding-ring polymer additive in the sealant composition is about 1 wt % to about 25 wt %, such as about 1 wt % to about 20 wt %, about 1 wt % to about 15 wt %, about 1 wt % to about 10 wt %, about 1 wt % to about 5 wt %, about 5 wt % to about 25 wt %, about 5 wt % to about 20 wt %, about 5 wt % to about 15 wt %, about 5 wt % to about 10 wt %, about 10 wt % to about 25 wt %, about 10 wt % to about 20 wt %, about 10 wt % to about 15 wt %, about 15 wt % to about 25 wt %, about 15 wt % to about 20 wt %, about 20 wt % to about 25 wt %, or about 1 wt %, about 5 wt %, about 10 wt %, about 15 wt %, about 20 wt %, or about 25 wt %. In some embodiments, the amount of sliding-ring polymer additive in the sealant composition is about 1 wt % to about 25 wt %. In some embodiments, the amount of sliding-ring polymer additive in the sealant composition is about 5 wt % to about 20 wt %. In some embodiments, the amount of sliding-ring polymer additive in the sealant composition is about 10 wt % to about 15 wt %. In some embodiments, the amount of sliding-ring polymer additive in the sealant composition is about 7 wt %. In some embodiments, the amount of sliding-ring polymer additive in the sealant composition is about 10 wt %. In some embodiments, the amount of sliding-ring polymer additive in the sealant composition is about 13 wt %. In some embodiments, the sliding-ring polymer additive is an acrylate-terminated polyrotaxane. An exemplary acrylate-terminated polyrotaxane is the one sold by Advanced Softmaterials (Japan) that is a solution in methyl ethyl ketones (active amount 50 wt %). In some embodiments, the sliding-ring polymer additive is a cross-linked polyrotaxane bead. An exemplary cross-linked polyrotaxane bead is the one sold by Advanced Softmaterials (Japan).

In some embodiments, the sealant composition contains an additive. In some embodiments, the additive is a curing agent. In some embodiments, the amount of additive in the sealant composition is about 5 wt % to about 30 wt %, about 5 wt % to about 25 wt %, about 5 wt % to about 20 wt %, about 5 wt % to about 15 wt %, about 5 wt % to about 10 wt %, about 10 wt % to about 30 wt %, about 10 wt % to about 25 wt %, about 10 wt % to about 20 wt %, about 10 wt % to about 15 wt %, about 15 wt % to about 30 wt %, about 15 wt % to about 25 wt %, about 15 wt % to about 20 wt %, about 20 wt % to about 30 wt %, about 20 wt % to about 25 wt %, about 25 wt % to about 30 wt %, or about 5 wt %, about 10 wt %, about 15 wt %, about 20 wt %, about 25 wt %, or about 30 wt %. In some embodiments, the amount of additive in the sealant composition is about 5 wt % to about 30 wt %. In some embodiments, the amount of additive in the sealant composition is about 10 wt % to about 25 wt %. In some embodiments, the amount of additive in the sealant composition is about 15 wt % to about 20 wt %. In some embodiments, the amount of additive in the sealant composition is about 22 wt %. In some embodiments, the amount of additive in the sealant composition is about 23 wt %. In some embodiments, the amount of additive in the sealant composition is about 25 wt %. In some embodiments, the additive is a polyetheramine. An exemplary polyetheramine is JEFFAMINE® D-230 polyetheramine (a difunctional, primary amine with an average molecular weight of about 230 characterized by repeating oxypropylene units in the backbone, sold by Huntsman Corporation, The Woodlands, TX).

In some embodiments, the polymeric matrix material and the curing agent are present in a ratio of about 75:25, or about 70:30, or about 65:35, or about 60:40, or about 80:20, or about 85:15. In some embodiments, the polymeric matrix material and the curing agent are present in a ratio of about 75:25.

3D-Printed Sealant Composition

In some embodiments, the sealant compositions of the present disclosure that contain a polymeric matrix material and a sliding-ring polymer additive are 3D-printed. In some embodiments, the 3D-printed sealant compositions contain one or more additives. In some embodiments, the 3D-printed sealant compositions contain a fumed silica.

In some embodiments, the amount of polymeric matrix material in the 3D-printed sealant composition is about 55 wt % to about 95 wt %, such as about 55 wt % to about 90 wt %, about 55 wt % to about 85 wt %, about 55 wt % to about 80 wt %, about 55 wt % to about 75 wt %, about 55 wt % to about 70 wt %, about 55 wt % to about 65 wt %, about 55 wt % to about 60 wt %, about 60 wt % to about 95 wt %, about 60 wt % to about 90 wt %, about 60 wt % to about 85 wt %, about 60 wt % to about 80 wt %, about 60 wt % to about 75 wt %, about 60 wt % to about 70 wt %, about 60 wt % to about 65 wt %, about 65 wt % to about 95 wt %, about 65 wt % to about 90 wt %, about 65 wt % to about 85 wt %, about 65 wt % to about 80 wt %, about 65 wt % to about 75 wt %, about 65 wt % to about 70 wt %, about 70 wt % to about 95 wt %, about 70 wt % to about 90 wt %, about 70 wt % to about 85 wt %, about 70 wt % to about 80 wt %, about 70 wt % to about 75 wt %, about 75 wt % to about 95 wt %, about 75 wt % to about 90 wt %, about 75 wt % to about 85 wt %, about 75 wt % to about 80 wt %, about 80 wt % to about 95 wt %, about 80 wt % to about 90 wt %, about 80 wt % to about 85 wt %, about 85 wt % to about 95 wt %, about 85 wt % to about 90 wt %, about 90 wt % to about 95 wt %, or about 55 wt %, about 60 wt %, about 65 wt %, about 70 wt %, about 75 wt %, about 80 wt %, about 85 wt %, about 90 wt %, or about 95 wt %. In some embodiments, the amount of polymeric matrix material in the 3D-printed sealant composition is about 55 wt % to about 95 wt %. In some embodiments, the amount of polymeric matrix material in the 3D-printed sealant composition is about 65 wt % to about 90 wt %. In some embodiments, the amount of polymeric matrix material in the 3D-printed sealant composition is about 80 wt % to about 85 wt %. In some embodiments, the amount of polymeric matrix material in the 3D-printed sealant composition is about 83 wt %. In some embodiments, the amount of polymeric matrix material in the 3D-printed sealant composition is about 85 wt %. In some embodiments, the polymeric matrix material is an epoxy resin. In some embodiments, the epoxy resin is a UV-cured epoxy resin. An exemplary UV-cured epoxy resin is UV Cure 60-7170 (a one-component epoxy that cures with low intensity black light or high intensity UV lamps; Epoxies, Cranston, RI).

In some embodiments, the amount of sliding-ring polymer additive in the 3D-printed sealant composition is about 1 wt % to about 15 wt %, such as about 1 wt % to about 12 wt %, about 1 wt % to about 10 wt %, about 1 wt % to about 7.5 wt %, about 1 wt % to about 5 wt %, about 1 wt % to about 2.5 wt %, about 2.5 wt % to about 15 wt %, about 2.5 wt % to about 12 wt %, about 2.5 wt % to about 10 wt %, about 2.5 wt % to about 7.5 wt %, about 2.5 wt % to about 5 wt %, about 5 wt % to about 15 wt %, about 5 wt % to about 12 wt %, about 5 wt % to about 10 wt %, about 5 wt % to about 7.5 wt %, about 7.5 wt % to about 15 wt %, about 7.5 wt % to about 10 wt %, about 10 wt % to about 15 wt %, about 10 wt % to about 12 wt %, about 12 wt % to about 15 wt %, or about 1 wt %, about 2.5 wt %, about 5 wt %, about 7.5 wt %, about 10 wt %, about 12 wt %, or about 15 wt %. In some embodiments, the amount of sliding-ring polymer additive in the 3D-printed sealant composition is about 1 wt % to about 25 wt %. In some embodiments, the amount of sliding-ring polymer additive in the 3D-printed sealant composition is about 5 wt % to about 20 wt %. In some embodiments, the amount of sliding-ring polymer additive in the 3D-printed sealant composition is about 10 wt % to about 15 wt %. In some embodiments, the amount of sliding-ring polymer additive in the 3D-printed sealant composition is about 2.5 wt %. In some embodiments, the sliding-ring polymer additive is an acrylate-terminated polyrotaxane. An exemplary acrylate-terminated polyrotaxane is the one sold by Advanced Softmaterials (Japan) that is a solution in methyl ethyl ketones (active amount 50 wt %). In some embodiments, the sliding-ring polymer additive is a cross-linked polyrotaxane bead. An exemplary cross-linked polyrotaxane bead is the one sold by Advanced Softmaterials (Japan). In some embodiments, the cross-linked polyrotaxane bead is surface-functionalized with epoxide rings.

In some embodiments, the 3D-printed sealant composition contains an additive. In some embodiments, the additive is fumed silica. In some embodiments, the amount of fumed silica in the 3D-printed sealant composition is about 5 wt % to about 30 wt %, about 5 wt % to about 25 wt %, about 5 wt % to about 20 wt %, about 5 wt % to about 15 wt %, about 5 wt % to about 10 wt %, about 10 wt % to about 30 wt %, about 10 wt % to about 25 wt %, about 10 wt % to about 20 wt %, about 10 wt % to about 15 wt %, about 15 wt % to about 30 wt %, about 15 wt % to about 25 wt %, about 15 wt % to about 20 wt %, about 20 wt % to about 30 wt %, about 20 wt % to about 25 wt %, about 25 wt % to about 30 wt %, or about 5 wt %, about 10 wt %, about 15 wt %, about 20 wt %, about 25 wt %, or about 30 wt %. In some embodiments, the amount of fumed silica in the 3D-printed sealant composition is about 5 wt % to about 30 wt %. In some embodiments, the amount of fumed silica in the 3D-printed sealant composition is about 10 wt % to about 25 wt %. In some embodiments, the amount of fumed silica in the 3D-printed sealant composition is about 15 wt % to about 20 wt %. In some embodiments, the amount of fumed silica in the 3D-printed sealant composition is about 15 wt %.

Properties of the Sealant Composition

In some embodiments, the sealant composition of the present disclosure exhibits increased strain tolerance or increased flexural strain as compared to a sealant composition that does not include the sliding-ring polymer additive. In some embodiments, the sealant composition containing a sliding-ring polymer additive exhibits flexural strain of about 0.15 to about 0.4, such as about 0.15 to about 0.35, about 0.15 to about 0.3, about 0.15 to about 0.25, about 0.15 to about 0.2, about 0.2 to about 0.4, about 0.2 to about 0.35, about 0.2 to about 0.3, about 0.2 to about 0.25, about 0.25 to about 0.4, about 0.25 to about 0.35, about 0.25 to about 0.3, about 0.3 to about 0.4, about 0.3 to about 0.35, about 0.35 to about 0.4, or about 0.15, about 0.2, about 0.25, about 0.3, about 0.35, or about 0.4. In some embodiments, the sealant composition is 3D-printed.

In some embodiments, the sealant composition of the present disclosure exhibits a flexural modulus of about 1 gigapascal (GPa) to about 5 GPa, such as about 1 GPa to about 4.5 GPa, about 1 GPa to about 4 GPa, about 1 GPa to about 3.5 GPa, about 1 GPa to about 3 GPa, about 1 GPa to about 2.5 GPa, about 1 GPa to about 2.3 GPa, about 1 GPa to about 2.2 GPa, about 1 GPa to about 2 GPa, about 1 GPa to about 1.5 GPa, about 1.5 GPa to about 5 GPa, about 1.5 GPa to about 4.5 GPa, about 1.5 GPa to about 4 GPa, about 1.5 GPa to about 3.5 GPa, about 1.5 GPa to about 3 GPa, about 1.5 GPa to about 2.5 GPa, about 1.5 GPa to about 2.3 GPa, about 1.5 GPa to about 2.2 GPa, about 1.5 GPa to about 2 GPa, about 2 GPa to about 5 GPa, about 2 GPa to about 4.5 GPa, about 2 GPa to about 4 GPa, about 2 GPa to about 3.5 GPa, about 2 GPa to about 3 GPa, about 2 GPa to about 2.5 GPa, about 2 GPa to about 2.3 GPa, about 2 GPa to about 2.2 GPa, about 2.2 GPa to about 5 GPa, about 2.2 GPa to about 4.5 GPa, about 2.2 GPa to about 4 GPa, about 2.2 GPa to about 3.5 GPa, about 2.2 GPa to about 3 GPa, about 2.2 GPa to about 2.5 GPa, about 2.2 GPa to about 2.3 GPa, about 2.3 GPa to about 5 GPa, about 2.3 GPa to about 4.5 GPa, about 2.3 GPa to about 4 GPa, about 2.3 GPa to about 3.5 GPa, about 2.3 GPa to about 3 GPa, about 2.3 GPa to about 2.5 GPa, about 2.5 GPa to about 5 GPa, about 2.5 GPa to about 4.5 GPa, about 2.5 GPa to about 4 GPa, about 2.5 GPa to about 3.5 GPa, about 2.5 GPa to about 3 GPa, about 3 GPa to about 5 GPa, about 3 GPa to about 4.5 GPa, about 3 GPa to about 4 GPa, about 3 GPa to about 3.5 GPa, about 3.5 GPa to about 5 GPa, about 3.5 GPa to about 4.5 GPa, about 3.5 GPa to about 4 GPa, about 4 GPa to about 5 GPa, about 4 GPa to about 4.5 GPa, about 4.5 GPa to about 5 GPa, or about 1 GPa, about 1.5 GPa, about 2 GPa, about 2.2 GPa, about 2.3 GPa, about 2.5 GPa, about 3 GPa, about 3.5 GPa, about 4 GPa, about 4.5 GPa, or about 5 GPa. In some embodiments, the sealant composition of the present disclosure exhibits a flexural modulus of about 1 GPa to about 3 GPa. In some embodiments, the sealant composition of the present disclosure exhibits a flexural modulus of about 2 GPa to about 2.5 GPa. In some embodiments, the sealant composition of the present disclosure exhibits a flexural modulus of about 2.2 GPa to about 2.3 GPa. In some embodiments, the sealant composition is 3D-printed.

In some embodiments, the sealant composition of the present disclosure exhibits a flexural strength of about 50 megapascal (MPa) to about 120 mPa, such as about 50 MPa to about 110 MPa, about 50 MPa to about 100 MPa, about 50 MPa to about 95 MPa, about 50 MPa to about 90 MPa, about 50 MPa to about 80 MPa, about 50 MPa to about 70 MPa, about 50 MPa to about 60 MPa, about 60 MPa to about 120 MPa, about 60 MPa to about 110 MPa, about 60 MPa to about 100 MPa, about 60 MPa to about 95 MPa, about 60 MPa to about 90 MPa, about 60 MPa to about 80 MPa, about 60 MPa to about 70 MPa, about 70 MPa to about 120 MPa, about 70 MPa to about 110 MPa, about 70 MPa to about 100 MPa, about 70 MPa to about 95 MPa, about 70 MPa to about 90 MPa, about 70 MPa to about 80 MPa, about 80 MPa to about 120 MPa, about 80 MPa to about 110 MPa, about 80 MPa to about 100 MPa, about 80 MPa to about 95 MPa, about 80 MPa to about 90 MPa, about 90 MPa to about 120 MPa, about 90 MPa to about 110 MPa, about 90 MPa to about 100 MPa, about 90 MPa to about 95 MPa, about 95 MPa to about 120 MPa, about 95 MPa to about 110 MPa, about 95 MPa to about 100 MPa, about 100 MPa to about 120 MPa, about 100 MPa to about 110 MPa, about 110 MPa to about 120 MPa, or about 60 MPa, about 70 MPa, about 80 MPa, about 90 MPa, about 95 MPa, about 100 MPa, about 110 MPa, or about 120 MPa. In some embodiments, the sealant composition of the present disclosure exhibits a flexural strength of about 50 MPa to about 100 MPa. In some embodiments, the sealant composition of the present disclosure exhibits a flexural strength of about 60 MPa to about 90 MPa. In some embodiments, the sealant composition of the present disclosure exhibits a flexural strength of about 70 MPa to about 80 MPa. In some embodiments, the sealant composition of the present disclosure exhibits a flexural strength of about 60 MPa to about 120 MPa. In some embodiments, the sealant composition of the present disclosure exhibits a flexural strength of about 70 MPa to about 100 MPa. In some embodiments, the sealant composition of the present disclosure exhibits a flexural strength of about 80 MPa to about 90 MPa. In some embodiments, the sealant composition is 3D-printed.

In some embodiments, the sealant composition of the present disclosure exhibits increased flexural toughness as compared to a sealant composition that does not include the sliding-ring polymer additive. In some embodiments, the sealant composition containing a sliding-ring polymer additive exhibits flexural toughness of about 5 $J \cdot m^3$ to about 30 $J \cdot m^3$, such as about 5 $J \cdot m^3$ to about 27 $J \cdot m^3$, about 5 $J \cdot m^3$ to about 25 $J \cdot m^3$, about 5 $J \cdot m^3$ to about 20 $J \cdot m^3$, about 5 $J \cdot m^3$ to about 18 $J \cdot m^3$, about 5 $J \cdot m^3$ to about 16 $J \cdot m^3$, about 5 $J \cdot m^3$ to about 12 $J \cdot m^3$, about 5 $J \cdot m^3$ to about 10 $J \cdot m^3$, about 5 $J \cdot m^3$ to about 9 $J \cdot m^3$, about 5 $J \cdot m^3$ to about 8 $J \cdot m^3$, about 5 $J \cdot m^3$ to about 6 J·m³, about 6 J·m³ to about 30 J·m³, about 6 J·m³ to about 27 J·m³, about 6 J·m³ to about 25 J·m³, about 6 J·m³ to about 20 J·m³, about 6 J·m³ to about 18 J·m³, about 6 J·m³ to about 16 J·m³, about 6 J·m³ to about 12 J·m³, about 6 J·m³ to about 10 J·m³, about 6 J·m³ to about 9 J·m³, about 6 J·m³ to about 8 J·m³, about 8 J·m³ to about 30 J·m³, about 8 J·m³ to about 27 J·m³, about 8 J·m³ to about 25 J·m³, about 8 J·m³ to about 20 J·m³, about 8 J·m³ to about 18 J·m³, about 8 J·m³ to about 16 J·m³, about 8 J·m³ to about 12 J·m³, about 8 J·m³ to about 10 J·m³, about 8 J·m³ to about 9 J·m³, about 9 J·m³ to about 30 J·m³, about 9 J·m³ to about 27 J·m³, about 9 J·m³ to about 25 J·m³, about 9 J·m³ to about 20 J·m³, about 9 J·m³ to about 18 J·m³, about 9 J·m³ to about 16 J·m³, about 9 J·m³ to about 12 J·m³, about 9 J·m³ to about 10 J·m³, about 10 J·m³ to about 30 J·m³, about 10 J·m³ to about 27 J·m³, about 10 J·m³ to about 25 J·m³, about 10 J·m³ to about 20 J·m³, about 10 J·m³ to about 18 J·m³, about 10 J·m³ to about 16 J·m³, about 10 J·m³ to about 12 J·m³, about 12 J·m³ to about 30 J·m³, about 12 J·m³ to about 27 J·m³, about 12 J·m³ to about 25 J·m³, about 12 J·m³ to about 20 J·m³, about 12 J·m³ to about 18 J·m³, about 12 J·m³ to about 16 J·m³, about 16 J·m³ to about 30 J·m³, about 16 J·m³ to about 27 J·m³, about 16 J·m³ to about 25 J·m³, about 16 J·m³ to about 20 J·m³, about 16 J·m³ to about 18 J·m³, about 18 J·m³ to about 30 J·m³, about 18 J·m³ to about 27 J·m³, about 18 J·m³ to about 25 J·m³, about 18 J·m³ to about 20 J·m³, about 20 J·m³ to about 30 J·m³, about 20 J·m³ to about 27 J·m³, about 20 J·m³ to about 25 J·m³, about 25 J·m³ to about 30 J·m³, or about 5 J·m³, about 6 J·m³, about 8 J·m³, about 9 J·m³, about 10 J·m³, about 12 J·m³, about 16 J·m³, about 18 J·m³, about 20 J·m³, about 25 J·m³, or about 30 J·m³. In some embodiments, the sealant composition containing a sliding-ring polymer additive exhibits flexural toughness of about 6 J·m³ to about 27 J·m³. In some embodiments, the sealant composition containing a sliding-ring polymer additive exhibits flexural toughness of about 9 J·m³ to about 20 J·m³. In some embodiments, the sealant composition containing a sliding-ring polymer additive exhibits flexural toughness of about 10 J·m³ to about 12 J·m³. In some embodiments, the sealant composition containing a sliding-ring polymer additive exhibits flexural toughness of about 8 J·m³ to about 30 J·m³. In some embodiments, the sealant composition containing a sliding-ring polymer additive exhibits flexural toughness of about 10 J·m³ to about 20 J·m³. In some embodiments, the sealant composition containing a sliding-ring polymer additive exhibits flexural toughness of about 12 J·m³ to about 16 J·m³. In some embodiments, the sealant composition is 3D-printed.

In some embodiments, the sealant composition of the present disclosure exhibits increased tensile strength as compared to a sealant composition that does not include the sliding-ring polymer additive. In some embodiments, the sealant composition is 3D-printed.

Method of Preparing a Sealant Composition

Provided in the present application is a method of preparing a sealant composition, such as a sealant composition described in this application. In some embodiments, the method includes mixing a sliding-ring polymer additive with a polymeric matrix material. In some embodiments, the sliding-ring polymer additive is as described in the present disclosure. In some embodiments, the sliding-ring polymer additive is as described in in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety. In some embodiments, the polymeric matrix material is selected from cement, an epoxy resin, and polyurethane. In some embodiments, the polymeric matrix material is an epoxy resin.

In some embodiments, the sealant composition containing the polymeric matrix material, sliding-ring polymer additive, and optionally an additive, such as a curing agent, is poured into a mold and cured. In some embodiments, the composition is cured at a temperature of about 200° F. to about 300° F., such as about 200° F. to about 275° F., about 200° F. to about 260° F., about 200° F. to about 250° F., about 200° F. to about 225° F., about 225° F. to about 300° F., about 225° F. to about 275° F., about 225° F. to about 260° F., about 225° F. to about 250° F., about 250° F. to about 300° F., about 250° F. to about 275° F., about 250° F. to about 260° F., about 260° F. to about 300° F., about 260° F. to about 275° F., about 275° F. to about 300° F., or about 200° F., about 225° F., about 250° F., about 260° F., about 275° F., or about 300° F. In some embodiments, the sealant composition is cured at a temperature of about 200° F. to about 300° F. In some embodiments, the sealant composition is cured at a temperature of about 225° F. to about 275° F. In some embodiments, the sealant composition is cured at a temperature of about 250° F. to about 260° F.

In some embodiments, the sealant composition is cured for about 20 minutes to about 150 minutes, such as about 20 minutes to about 120 minutes, about 20 minutes to about 100 minutes, about 20 minutes to about 90 minutes, about 20 minutes to about 70 minutes, about 20 minutes to about 60 minutes, about 20 minutes to about 50 minutes, about 20 minutes to about 30 minutes, about 30 minutes to about 150 minutes, about 30 minutes to about 120 minutes, about 30 minutes to about 100 minutes, about 30 minutes to about 90 minutes, about 30 minutes to about 70 minutes, about 30 minutes to about 60 minutes, about 30 minutes to about 50 minutes, about 50 minutes to about 150 minutes, about 50 minutes to about 120 minutes, about 50 minutes to about 100 minutes, about 50 minutes to about 90 minutes, about 50 minutes to about 70 minutes, about 50 minutes to about 60 minutes, about 60 minutes to about 150 minutes, about 60 minutes to about 120 minutes, about 60 minutes to about 100 minutes, about 60 minutes to about 90 minutes, about 60 minutes to about 70 minutes, about 70 minutes to about 150 minutes, about 70 minutes to about 120 minutes, about 70 minutes to about 100 minutes, about 70 minutes to about 90 minutes, about 90 minutes to about 150 minutes, about 90 minutes to about 120 minutes, about 90 minutes to about 100 minutes, about 100 minutes to about 150 minutes, about 100 minutes to about 120 minutes, about 120 minutes to about 150 minutes, or about 20 minutes, about 30 minutes, about 50 minutes, about 60 minutes, about 70 minutes, about 90 minutes, about 100 minutes, about 120 minutes, or about 150 minutes. In some embodiments, the sealant composition is cured for about 20 minutes to about 150 minutes. In some embodiments, the sealant composition is cured for about 50 minutes to about 100 minutes. In some embodiments, the sealant composition is cured for about 70 minutes to about 90 minutes.

Also provided in the present application is a method of preparing a 3D-printed sealant composition, such as a 3D-printed sealant composition described in this application. In some embodiments, the 3D-printed sealant composition includes a 3D printing ink. In some embodiments, the 3D printing ink includes an epoxy composition. In some embodiments, the epoxy composition contains two or more epoxy resins. In some embodiments, the epoxy resin contains a bisphenol A-based epoxy resin, a polyetheramine resin, or combination thereof. In some embodiments, the bisphenol A-based epoxy resin is EPON™ Resin 826. In some embodiments, the epoxy resin contains a bisphenol A-based epoxy resin and a polyetheramine resin. In some embodiments, the polyetheramine resin is JEFFAMINE® D-230 polyetheramine. In some embodiments, the method includes mixing a sliding-ring polymer additive with a polymeric matrix material. In some embodiments, the sliding-ring polymer additive is as described in the present disclosure. In some embodiments, the sliding-ring polymer additive is as described in in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety. In some embodiments, the polymeric matrix material is selected from cement, an epoxy resin, and polyurethane. In some embodiments, the polymeric matrix material is an epoxy resin. In some embodiments, the sealant composition further includes fumed silica. In some embodiments, the 3D-printed structures are cured. In some embodiments, the 3D-printed structures are cured by heat.

Methods of Using the Sealant Composition Containing a Sliding-Ring Polymer Additive Provided in this disclosure is a method of enhancing the mechanical properties of a sealant composition. In some embodiments, the sealant composition contains a sliding-ring polymer additive and exhibits enhanced mechanical properties as compared to the same sealant composition that does not contain the sliding-ring polymer additive. In some embodiments, the sealant compositions of the present disclosure exhibit increased strain tolerance as compared to the same sealant composition that does not contain the sliding-ring polymer additive. In some embodiments, the sealant compositions of the present disclosure exhibit increased tensile strength as compared to the same sealant composition that does not contain the sliding-ring polymer additive.

In some embodiments, the sealant composition contains cement. Thus, also provided is a method for providing long-term zonal isolation in oil wells (that is, subterranean formations) including providing to an oil well a sealant composition that contains cement and a sliding-ring polymer additive such as described in this disclosure. In some embodiments, the sliding-ring polymer additive is as described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety. In some embodiments, the providing occurs above the surface. The providing can also occur in the subterranean formation.

The subterranean formation can contain a wellbore containing a steel casing or multiple casings, a cement sheath in the annuli, and optionally a packer and a production tubing. The cement sheath, can experience stresses and annular pressure buildup due to, for example, gas flow through microchannels in the annulus, forming microannuli, and fractures (for example, microfractures), cracks and clefts within or around the cement sheath, the casing, or the production tubing. This can result in a deterioration of the mechanical properties of the cement and lead to formation of micro-cracks and fractures, which affect the production and increase the cost of operation.

In some embodiments, the sliding-ring polymer additive improves the stiffness of the sealant composition containing cement and thus the well cement. In some embodiments, the sealant composition containing cement and the sliding-ring polymer additive is stable in downhole conditions. In some embodiments, the sliding-ring polymer additive allows for uniform distribution of the stresses experienced in the cement matrix, thus enhancing the properties of the sealant composition.

Examples

Example 1—Synthesis of Polyrotaxanes A series of polyrotaxanes were prepared from linear polymers that included polyethylene glycol (PEG), polypropylene glycol (PPG), block copolymers of PEG and PPG, and polysiloxanes (PS) that were terminated with one or more of an amine, carboxylate, azide, isocyanate, carbonyl chloride, halide, and thiol; and ring components that included α-cyclodextrin (α-CD), β-cyclodextrin (β-CD), and γ-cyclodextrin (γ-CD).

Inclusion Complexes

An exemplary polyrotaxane inclusion complex was prepared as follows.

Figure 3:
FIG. 3 illustrates the formation of an inclusion complex.

9.0 g of carboxylate terminated polyethylene glycol (HOOC-PEG-COOH, MW=20000) and 36.0 g of α-cyclodextrin (α-CD) were dissolved in 100 mL deionized water and kept refrigerated for 24 h. The polyrotaxane inclusion complex formed as a white paste which was dried at room temperature under vacuum or freeze-dried, to obtain a white powder, designated as inclusion complex A (FIG. 3).

Similar methods were employed to obtain the inclusion complexes of carboxy-terminated polypropylene glycol (HOOC—PPG-COOH) and carboxy-terminated polysiloxanes (HOOC—PS—COOH) with β-cyclodextrin (β-CD) and γ-cyclodextrin (γ-CD), respectively.

10 grams (g) of ($NH_2$—PS—$NH_2$, MW=25000) and 30.0 g of γ-cyclodextrin (γ-CD) were dissolved in 100 milliliters (mL) deionized water and stirred at room temperature for 12 hours (h). The polyrotaxane formed as a white precipitate, which was filtered and dried at 80° C. under vacuum or freeze-dried, to obtain a white powder, designated as γ-CD-PS—$NH_2$ (FIG. 3, where R=$NH_2$).

A similar method was employed to obtain the inclusion complexes of R-terminated PEG, PPG, PS and block polymers of PEG and PPG. α-cyclodextrin (α-CD), β-cyclodextrin (β-CD), γ-cyclodextrin (γ-CD), or combination of these cyclic compounds with linear polymers.

End-Capped Inclusion Complexes

Figure 4:
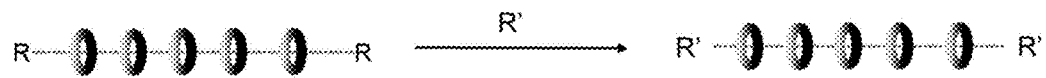
FIG. 4 illustrates end-capping of an inclusion complex.

The dried inclusion complex A (10 g) was mixed with adamantanamine (0.13 g), (benzotriazol-1-yloxy)tris(dimethylamino)phosphonium hexafluorophosphate (0.4 g), and ethyldiisopropylamine (0.12) dissolved in 80 mL dimethylformamide. The mixture was reacted at 2-5° C. for 24 h. The dispersion was filtered or centrifuged and washed with a mixture of dimethylformamide/methanol 2-3 times. The precipitates were dissolved in dimethylsulfoxide and precipitated by adding deionized water. The precipitates were filtered/centrifuged and dried at room temperature under vacuum or freeze dried, to obtain polyrotaxane A (FIG. 4).

When there are other functionalities (such as amine, azide, isocyanate, carbonyl chloride, halides, thiol) present in complex A, capping agents such as adamantaneacetic acid, 2,4-dinitrofluorobenzene, and amine-terminated aromatic compounds have been employed.

Figure 5:
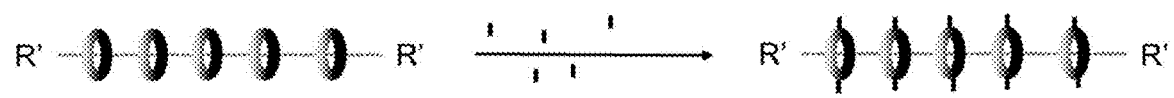
FIG. 5 illustrates functionalization of the surface of cyclodextrins.

Functionalized Polyrotaxanes 3.5 g of polyrotaxane A was dissolved in 1 N aqueous NaOH (350 mL) at 0-5° C. Propylene oxide (26.8 g) was added drop-wise, and the mixture stirred overnight from 0-5° C. to room temperature with the melting of ice in the bath. The functionalized polyrotaxane was dialyzed against deionized water for 3 days. The water was evaporated or the solution was freeze-dried under vacuum to obtain functionalized polyrotaxane A (FIG. 5).

The described functionalization is based on hydroxypropylation. However, functionalization such as methylation, hydroxypropylation, tritylation, acetylation, trimethylsilylation, phenylcarbamation, dansylation, and nitration, can also be used to generate functionalized polyrotaxanes.

Figure 6:
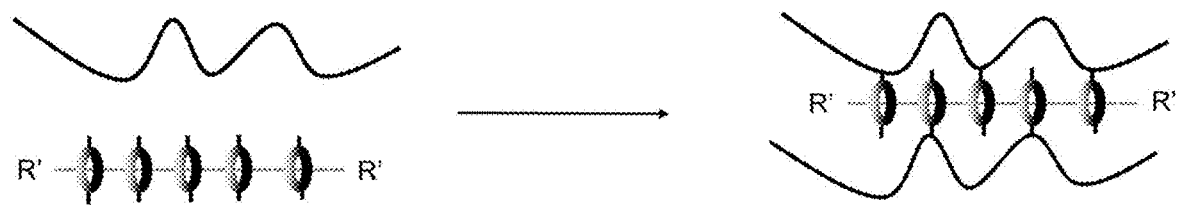
FIG. 6 illustrates the general synthesis of sliding-ring polymers.

Sliding-Ring Polymer Synthesis 9.5 g of polyacrylic acid (MW=450,000) was dissolved in 190 mL dimethyl sulfoxide. 0.12 g of 1,1'-carbonyldiimidazole dissolved in 5 mL dimethylsulfoxide was then added to the solution and the mixture was stirred at 50° C. for 12-15 h under an inert atmosphere. The reaction mixture was cooled to room temperature. A solution of functionalized polyrotaxane A (0.5 g in 5 mL dimethylsulfoxide) was added over 30 min under an inert atmosphere with stirring. After stirring for 30 min at room temperature, the reaction mixture was heated to 65-70° C. for 72 h. The sliding-ring polymer was precipitated from tetrahydrofuran and filtered. The polymer was dried at room temperature under vacuum or freeze-dried, to obtain sliding-ring polymer A (FIG. 6).

Other than polyacrylic acid, polymers with high molecular weight and functionalities such as carboxylic acid, maleic acid, and amine groups were also employed to obtain sliding-ring polymers.

Figure 7:
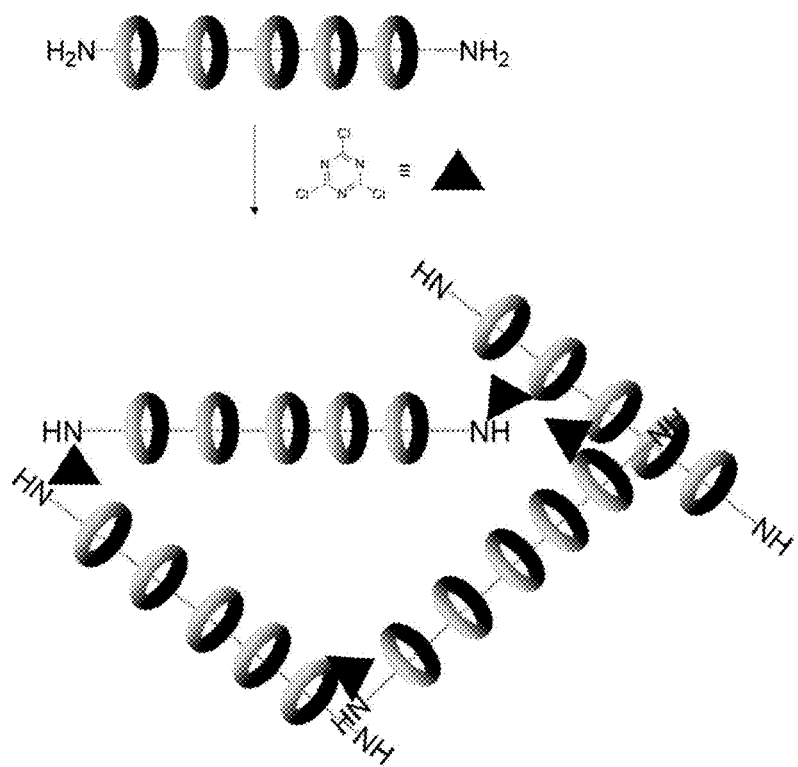
FIG. 7 is a schematic of the synthesis of a cross-linked polyrotaxane cross-linked via cyanuric chloride reaction between the amine terminal groups of the polymer of the polyrotaxane and functional groups of the ring compounds of the polyrotaxane.

Cross-Linked Polyrotaxanes 20 g of γ-CD-PS—NH$_2$ was dispersed in acetonitrile (250 mL) and triethylamine (10 mL) was added. A solution of cyanuric chloride (CC; 2 g in 20 mL acetonitrile) was added to the above mixture at room temperature with stirring. The reaction mixture was refluxed for 8 hours and the precipitates were filtered and dried at 80° C. to obtain the cross-linked polyrotaxane γ-CD-PS—NH—CC(FIG. 7).

Example 2—Formulation of Epoxy Compositions

Figure 8:
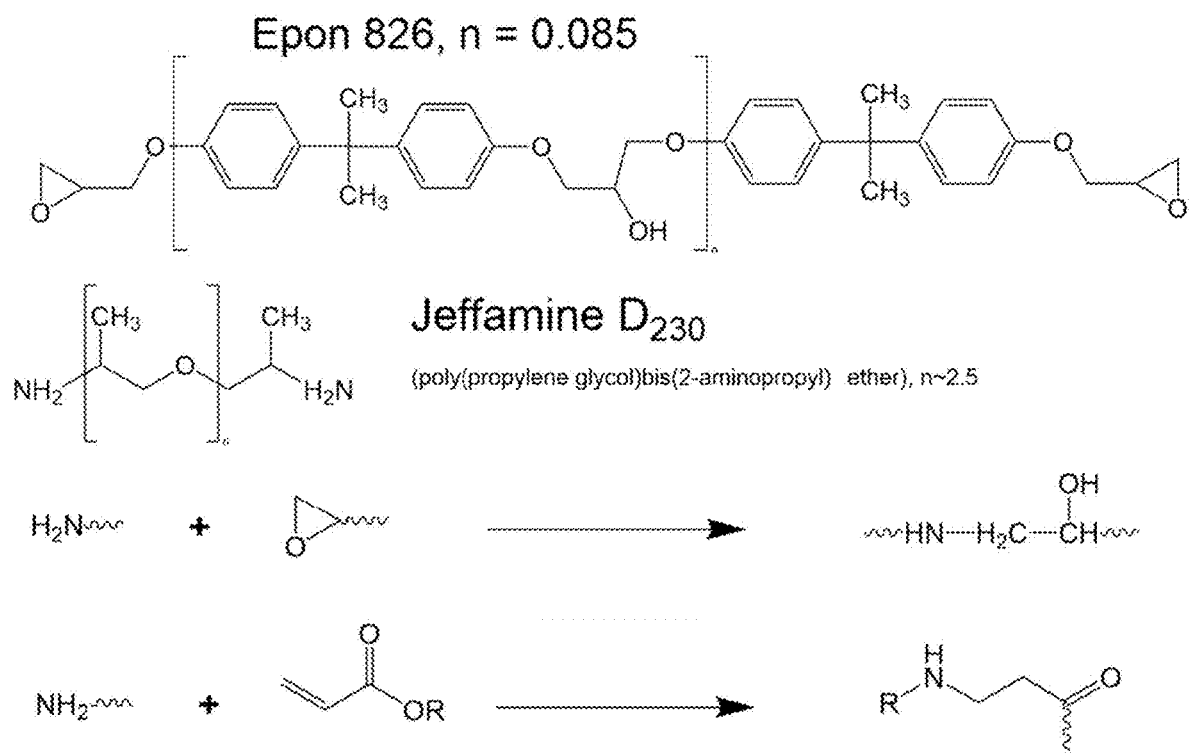
FIG. 8 is a schematic showing the structures of an exemplary epoxy resin and exemplary polyetheramine and exemplary reaction pathways to form exemplary epoxy compositions.

A two-part epoxy was designed using EPON™ Resin 826 (a low viscosity, light colored liquid bisphenol A based epoxy resin sold by Hexion Inc., Columbus, OH) and JEFFAMINE® D-230 polyetheramine (a difunctional, primary amine with an average molecular weight of about 230 characterized by repeating oxypropylene units in the backbone, sold by Huntsman Corporation, The Woodlands, TX), at a ratio of 75:25 by weight of EPON™ Resin 826 to JEFFAMINE®D-230 in excess (Composition 1, Table 1). The chemical formulation and reactions are shown in FIG. 8. The epoxide groups of the EPON™ Resin 826 reacted with the amine functional groups of the JEFFAMINE®D-230 through a ring opening reaction. At higher temperatures, the reaction was controlled with a hardening time of about 15 minutes at 225° F. This reaction can happen over time without the need for a catalyst or heat.

Figure 9:
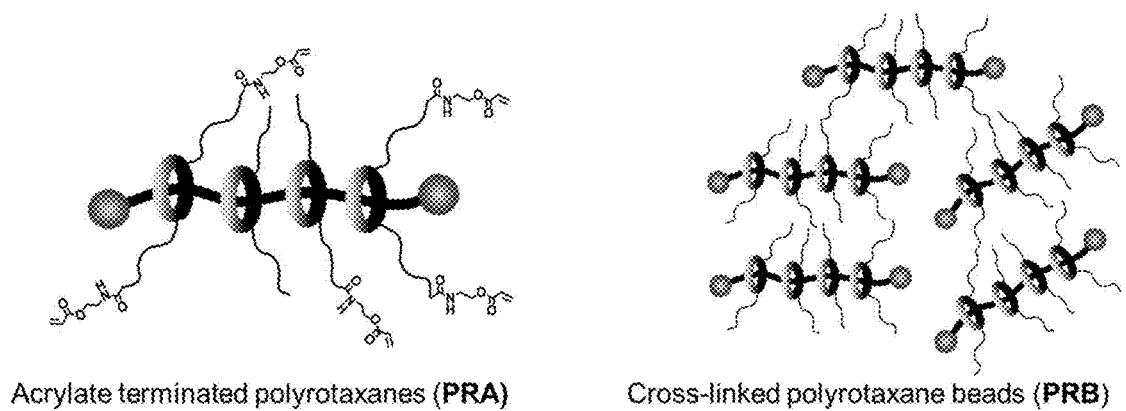
FIG. 9 is an illustration of acrylate terminated polyrotaxanes (PRA) and cross-linked polyrotaxane beads (PRB).

Compositions 2 and 3 were also prepared and contained either acrylate-terminated polyrotaxanes (PRA) or cross-linked polyrotaxane beads (PRB), respectively (FIG. 9). The acrylate terminated polyrotaxanes (a solution in methyl ethyl ketones (active amount 50% w/w)) and the cross-linked polyrotaxane beads were from Advanced Softmaterials (Japan). The polyrotaxane beads were composed of a mixture of polyethyleneglycol, alpha-cyclodextrin, polycaprolactum, polyurethane, and adamantane. Briefly, alpha-cyclodextrin was threaded on the polyethylene chain and subsequently capped on both side of the polyethylene glycol chain by adamantane. The polycaprolactum and polyurethane were linked on the surface of cyclodextrin. This generated the cross-linked polyrotaxanes beads. The acrylate moieties on the polyrotaxane monomers reacted with the amines through an aza-Michael addition. Polyrotaxane beads (PRB), a pre-crosslinked polyrotaxane structure, was added into the epoxy mixture. The epoxide reacted with hydroxyl groups of the cyclodextrin to form a crosslinked PRB epoxy structure owing to the enhanced strain tolerance observed in PRB. The formulation was cured at 225° F. for 1 hour and at 266° F. for 1.5 hours.

TABLE 1

| | Composition of thermally-cured epoxy composites | | | |
|---|---|---|---|---|
| Epoxy composition | EPON™ 826 (g) | JEFFAMINE® D-230 (g) | Acrylate-terminated polyrotaxane (g) | Cross-linked polyrotaxane beads (g) |
| 1 | 75 | 25 | — | — |
| 2 | 75 | 25 | 15 | — |
| 3 | 75 | 25 | — | 7.5 |

Samples for mechanical testing using compression and flexure, or three-point bending, were conducted with geometries following ASTM flexure testing standards for rigid plastics. Compression samples were prepared as rectangular prisms with a base of 0.5×0.5 inches and a height of 1 inch. Flexure tests followed ASTM International standards for flexure testing of rigid plastics with specimen geometries of thickness under 3 mm, width of approximately 12 mm, and length of approximately 52 mm with an extension rate during testing of 1.3 mm/min.

Figure 10A:
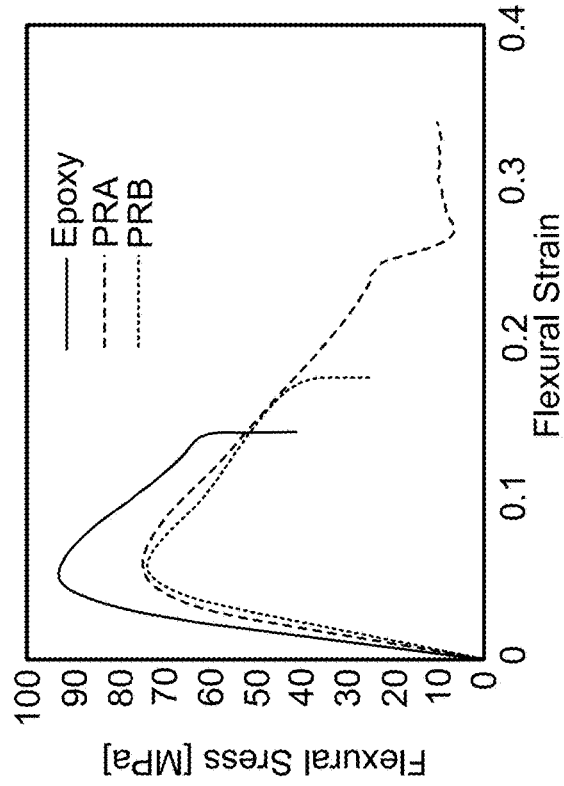
FIGS. 10A-10E depict flexural strength measurements of various epoxy compositions.

A flexure epoxy sample containing 10 wt % epoxy composition 2 (containing PRA) and samples containing 10 wt % epoxy composition 3 (containing PRB) were prepared for flexure testing. Flexure tests of pure epoxy (composition 1), composition 2 (PRA), and composition 3 (PRB) were tested using the universal testing systems (Instron Instruments). Normalized load displacement curves with respect to sample thickness (mm) were plotted using representative plots. Six specimens were tested per sample set. Samples containing 10 wt % composition 3 (PRB) showed increased strain tolerance with three out of six samples not fracturing up to 30 mm of extension. One sample from the composition 3 sample set fractured past 20 mm of extension while two samples fractured prematurely. Composition 2 samples (PRA) showed a reduction in flexural strength (FIG. 10E) and an increase in strain tolerance compared to pure epoxy flexure samples (composition 1) (FIG. 10B).

While epoxy samples (composition 1) yielded more impressive maximum load tolerance/specimen thickness (N/mm) (FIGS. 10A and 10D) with an average value of 46.74+/−1.43 N/mm over the PRA (composition 2) and composition 3 (PRB) samples with values of maximum load tolerance/specimen thickness at 42.07+/−1.34 and 40.87+/−0.85 N/mm, respectively, the polyrotaxane-loaded samples demonstrated increased strain tolerance where 50% of composition 3 (PRB) samples failed to fracture and 66% of samples exceeded the average strain to failure of both epoxy, 0.149+/−0.011, and composition 2 (PRA), 0.1619+/−0.014 with an average fracture at extension values of 16.03+/−

1.002 and 14.72+/−1.217 for epoxy (composition 1) and PRA (composition 2), respectively. Both composition 2 (PRA) and composition 3 (PRB) increased in strain tolerance (FIG. 10B) with the addition of a polyrotaxane structure to the matrix, however, other mechanical properties obtained from flexure tests reduced, including the flexural modulus, or modulus of elasticity, by ~14% in composition 2 (2.59 GPa) and ~20% (2.42 GPa) in composition 3 when compared to epoxy (composition 1) at 3.03 GPa (FIG. 10C).

Figure 10B:
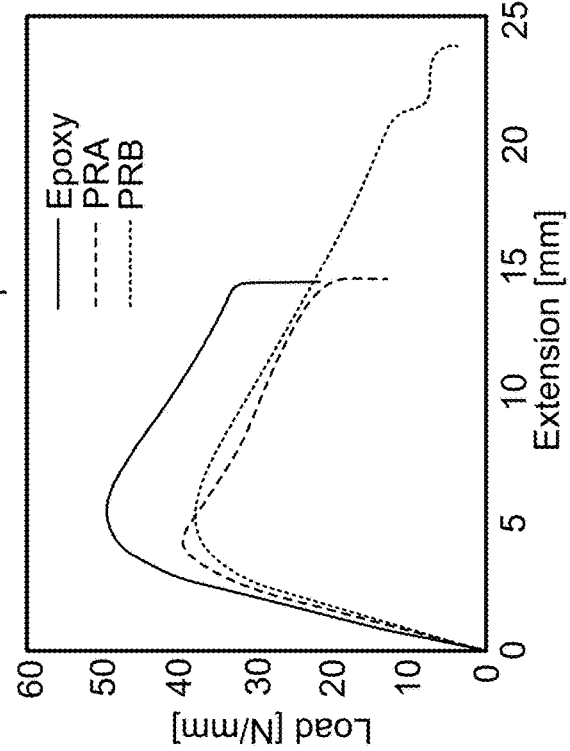
Figure 10C:
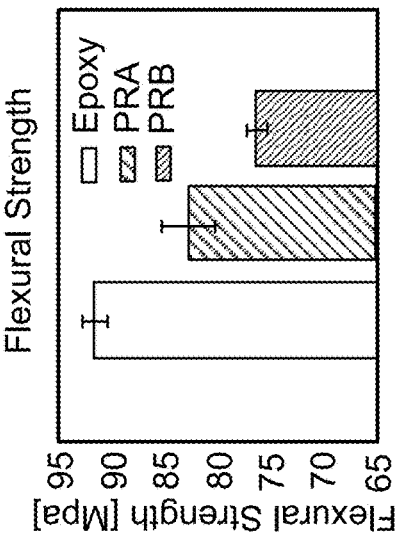
Figure 10D:
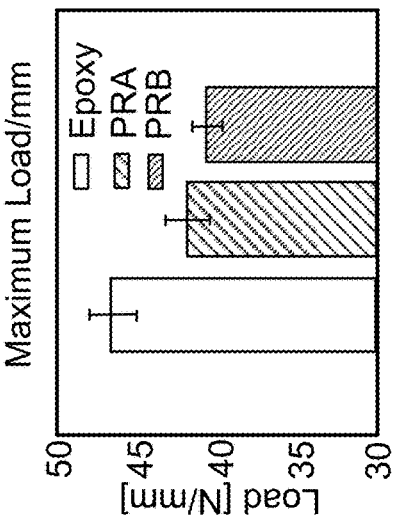
Figure 10E:
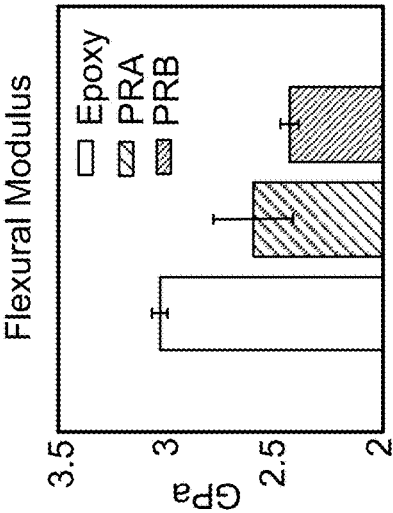
Figure 11:
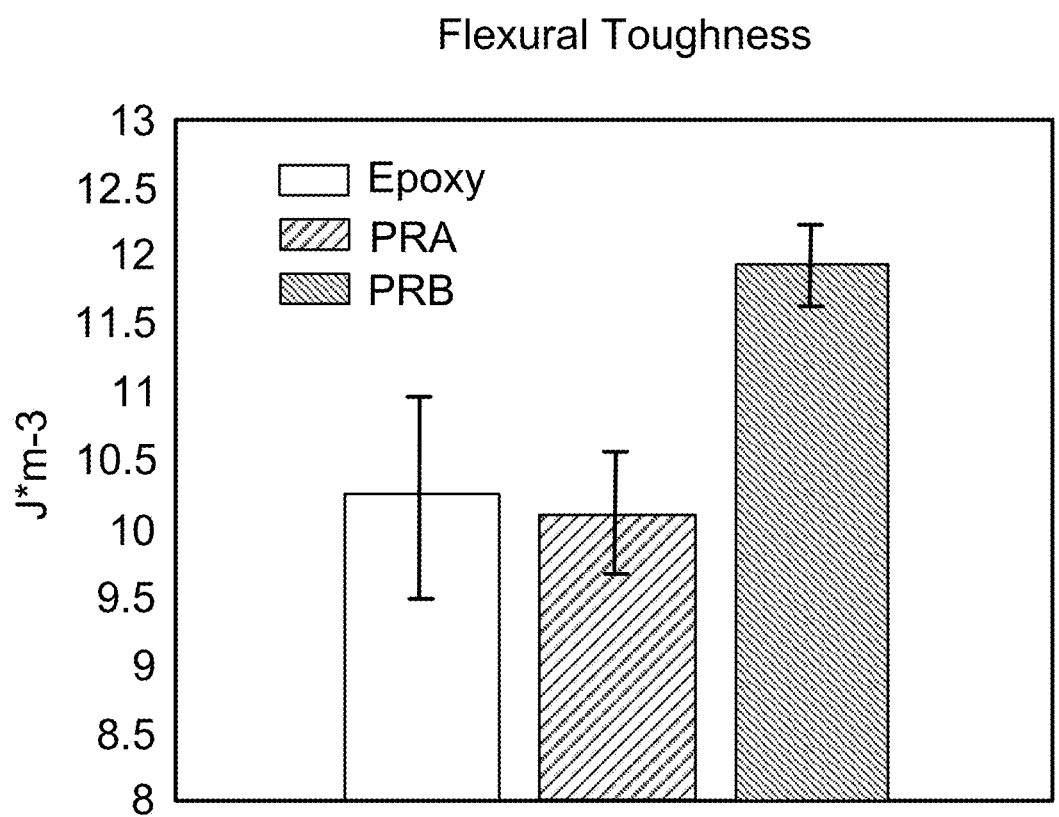
FIG. 11 is a graph showing the flexural toughness of various epoxy compositions.

Taking the area under the curve in the stress-strain plots in FIG. 10B, the modulus of toughness was estimated for the three different samples and displayed in FIG. 11. These results show that PRB is able to absorb more energy density before fracture than the other two samples, demonstrating the utility in loading the epoxy with polyrotaxane beads.

Example 3-3D-Printing of Epoxy-Polyrotaxane

Figure 12A:
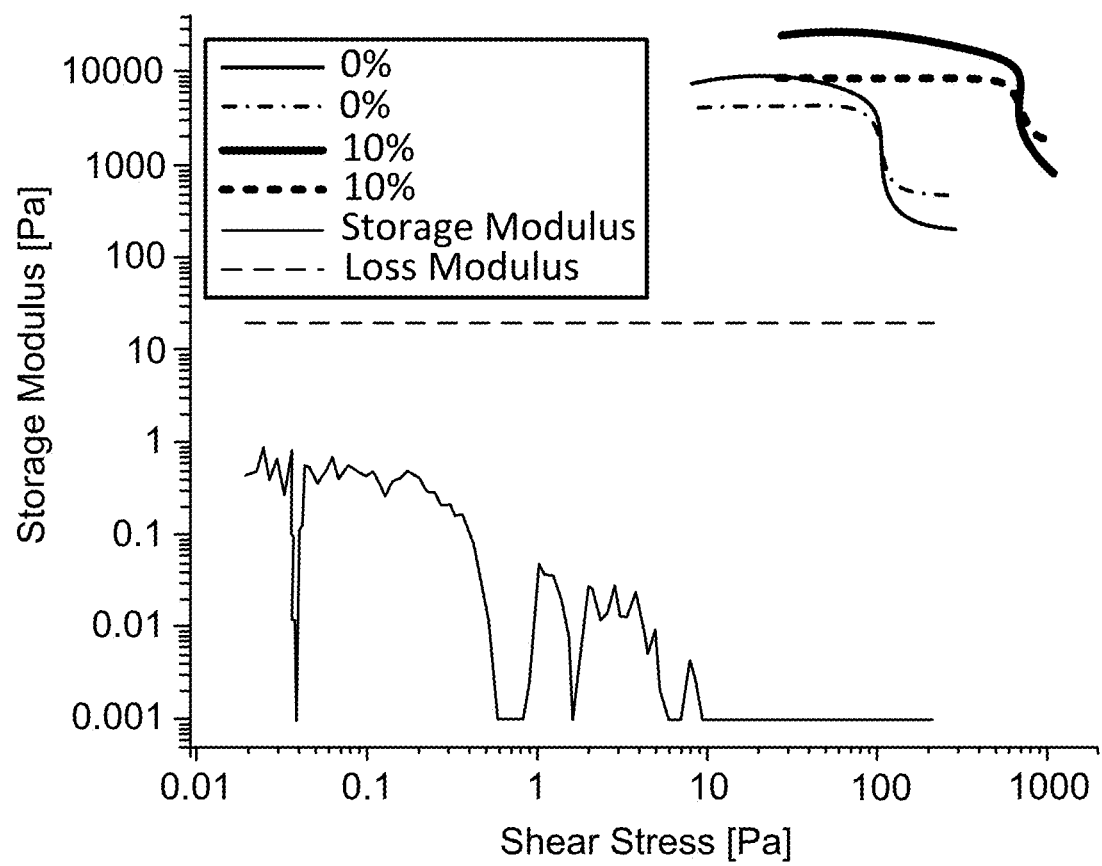
FIGS. 12A-12D depict rheology (FIG. 12A) and 3D-printed architecture of epoxy-polyrotaxane (FIGS. 12B-12D).
Figure 12B:
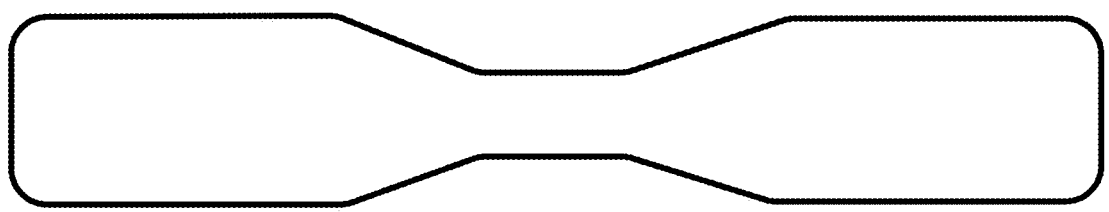
Figure 12C:
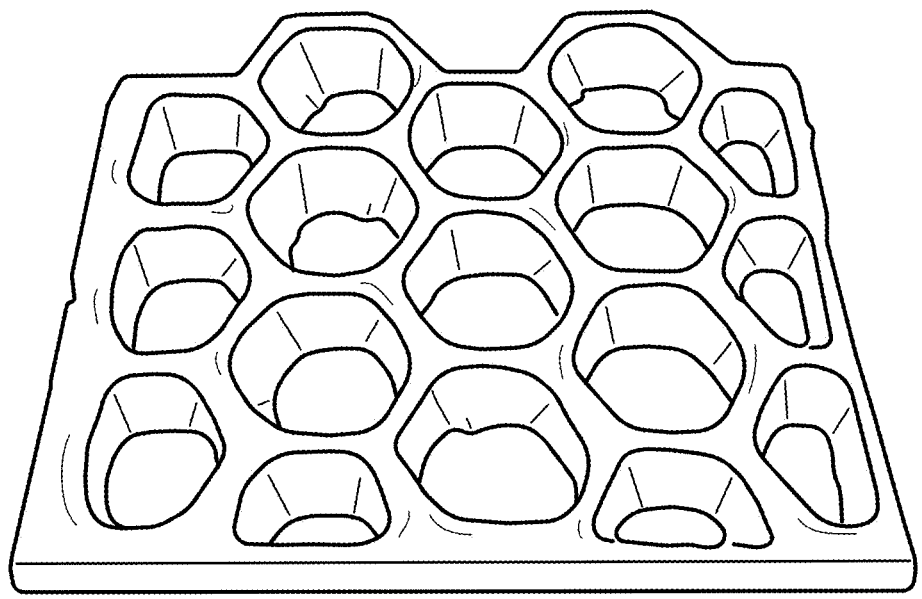
Figure 12D:
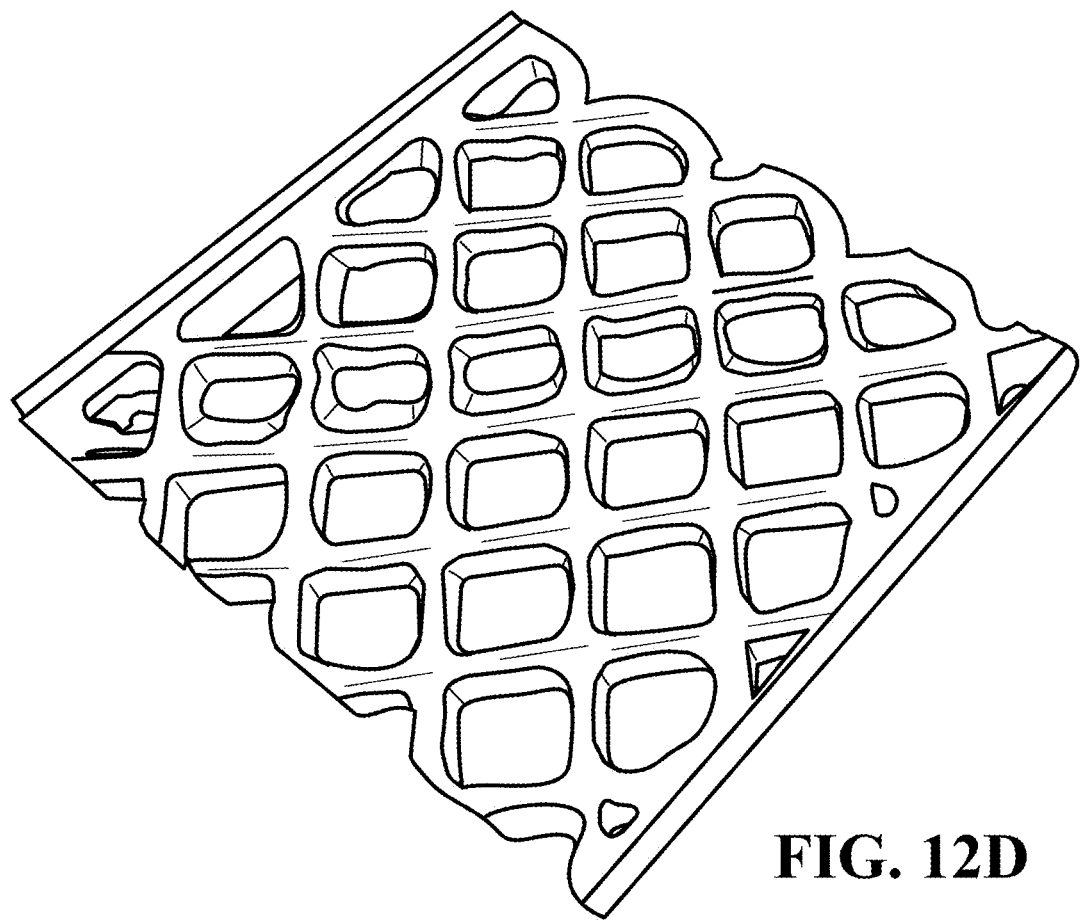

Two 3D-printed samples of epoxy-polyrotaxane were prepared—epoxy without PRB and epoxy with 2.5% PRB (FIGS. 12B-12D). PRBs act as rheological modifiers at room temperature (FIG. 12A), however, at higher temperatures, thermal thinning can cause the printed structure to lose the viscoelastic properties required to retain the extruded shape. Therefore, fumed silica was added to the formulation to hold the shape of the structure (Table 2). 3D structure A contained UV Cure 60-7170 (a one-component epoxy that cures with low intensity black light or high intensity UV lamps; Epoxies, Cranston, RI) and fumed silica and 3D structure B contained UV Cure 60-7170, cross-linked polyrotaxane beads (Advanced Softmaterials, Japan), and fumed silica.

TABLE 2

Composition of UV-cured epoxy composites for 3D-printed structures

| 3D structure | UV Cure 60-7170 (g) | PRB (g) | Fumed silica (g) |
|---|---|---|---|
| A | 85 | — | 15 |
| B | 85 | 2.5 | 15 |

3D printing inks were formulated by mixing EPON™ Resin 826 and JEFFAMINE® D-230 polyetheramine. A planetary centrifugal mixer was employed to ensure homogeneous mixing of each component. Samples were printed using a HyRel High Resolution Engine with a 14-gauge nozzle and STL files were sliced using Slic3r software. The curing of 3D-printed structures was carried out by heating the samples.

Epoxy filled with PRB and fumed silica were printed with different patterns and geometries including dog bones for tensile testing and 2D architecture lattices. Printing alignment could be modified to print filament along any angle and lattices of different orientation. 3D-printed epoxy PRB can be utilized to develop architectures and patterns with increased strain tolerance under compression as well as reducing material cost.

Scanning electron microscope (SEM) images of UV Cure 60-7170 epoxy with PRB were taken at different magnifications on the 3D-printed tensile fracture specimen shown in FIG. 12B. Tensile specimens were coated with a thin layer of conductive gold/platinum to acquire the images under SEM. As shown in FIG. 13A, PRBs are dispersed within a thin matrix showing high dispersion. FIG. 13D shows the particle size distribution of PRB under SEM where the average particle size is 14 μm. Particles dispersed in epoxy retained shape and size following curing procedures. Tensile fracture under SEM of PRB-containing epoxy (FIGS. 13A and 13C) and pure epoxy (FIG. 13B) highlight the effect of PRBs on the fracture pattern of the tensile specimen. Tensile fracture behavior clearly differs between PRB-containing epoxy and pure epoxy, with PRBs acting as fracture sites thereby reducing the tensile properties. While PRB crack propagation appears to be reduced by PRBs, tensile data suggests that the PRBs are acting as weaknesses in the matrix during tensile stresses. On the other hand, pure epoxy fracture pattern was consistent with brittle material fracture and had a more consistent behavior throughout the structure with fewer fracture sites. From FIG. 12C, the PRBs are visibly embedded in the epoxy matrix. While the PRBs were embedded in the matrix, they were not a fixed part of the matrix by strong or many covalent bonds, thereby further causing a reduction in tensile properties. To overcome this, PRBs were surface functionalized with epoxide rings using epichlorohydrin to increase the matrix adhesion of the PRBs by increased covalent bonding.

What is claimed is:

1. A sealant composition comprising:
   about 65 wt % to about 95 wt % of a UV-cured epoxy resin;
   about 5 wt % to about 20 wt % of a fumed silica; and
   about 1 wt % to about 7.5 wt % of a sliding-ring polymer additive comprising at least two molecules of a polyrotaxane selected from the group consisting of an acrylate-terminated polyrotaxane and a cross-linked polyrotaxane bead, wherein the polyrotaxane comprises:
   a linear polymer;
   at least one ring compound, wherein the linear polymer is threaded through the opening of the ring compound; and
   stopper groups disposed at both end terminals of the linear polymer;
   wherein the cross-linked polyrotaxane bead is surface-functionalized with epoxide rings; and
   wherein the sealant composition exhibits improved tensile strength as compared to the same composition without the sliding-ring polymer additive.

2. The sealant composition of claim 1, wherein the UV-cured epoxy resin is present in an amount of about 65 wt % to about 90 wt %, about 75 wt % to about 85 wt %, or about 80 wt % to about 85 wt % of the sealant composition.

3. The sealant composition of claim 1, wherein the sliding-ring polymer additive is an acrylate-terminated polyrotaxane.

4. The sealant composition of claim 1, wherein the sliding-ring polymer additive is cross-linked polyrotaxane beads, wherein the cross-linked polyrotaxane beads are surface-functionalized with epoxide rings.

5. The sealant composition of claim 1, wherein the sliding-ring polymer additive is present in an amount of about 1 wt % to about 5 wt % of the sealant composition.

6. The sealant composition of claim 1, wherein the sealant composition is able to be 3D-printed.

7. The sealant composition of claim 1, wherein the sealant composition exhibits increased strain tolerance- or flexural strain as compared to the same sealant composition without the sliding-ring polymer additive.

8. A method for preparing a 3D-printed sealant composition, the method comprising:
3D-printing the sealant composition of claim 1.

9. A method for enhancing the mechanical properties of a sealant composition, the method comprising preparing the sealant composition of claim 1.

10. The sealant composition of claim 1, wherein the sealant composition comprises:
- about 75 wt % to about 90 wt % of the UV-cured epoxy resin;
- about 10 wt % to about 20 wt % of the fumed silica; and
- about 1 wt % to about 5 wt % of the cross-linked polyrotaxane bead.

11. The sealant composition of claim 1, wherein the sealant composition comprises:
- about 80 wt % to about 90 wt % of the UV-cured epoxy resin;
- about 10 wt % to about 20 wt % of the fumed silica; and
- about 1 wt % to about 2.5 wt % of the cross-linked polyrotaxane bead.

12. The sealant composition of claim 1, wherein the sealant composition comprises:
- about 85 wt % the UV-cured epoxy resin;
- about 15 wt % of the fumed silica; and
- about 2.5 wt % of the cross-linked polyrotaxane bead.

\* \* \* \* \*